United States Patent
Damrow

(10) Patent No.: US 12,327,228 B2
(45) Date of Patent: Jun. 10, 2025

(54) OBJECT DIGITIZATION UTILIZING TOKENS

(71) Applicant: Twigital, Inc., Wilmington, DE (US)

(72) Inventor: Jesse Jonathan Damrow, Milwaukee, WI (US)

(73) Assignee: Twigital, Inc., Wilmington, DE (US)

( * ) Notice: Subject to any disclaimer, the term of this patent is extended or adjusted under 35 U.S.C. 154(b) by 0 days.

(21) Appl. No.: 18/140,377

(22) Filed: Apr. 27, 2023

(65) Prior Publication Data

US 2023/0351347 A1 Nov. 2, 2023

Related U.S. Application Data

(60) Provisional application No. 63/336,164, filed on Apr. 28, 2022.

(51) Int. Cl.
*G06Q 20/10* (2012.01)
*G06Q 20/36* (2012.01)

(52) U.S. Cl.
CPC .......... *G06Q 20/102* (2013.01); *G06Q 20/36* (2013.01)

(58) Field of Classification Search
USPC ......................................................... 705/40
See application file for complete search history.

(56) References Cited

U.S. PATENT DOCUMENTS

| | | | |
|---|---|---|---|
| 2015/0228002 A1* | 8/2015 | Berger ............... | G06Q 30/0627 705/26.63 |
| 2021/0390549 A1* | 12/2021 | Rule .................... | G06Q 20/403 |
| 2022/0294630 A1* | 9/2022 | Collen ................. | G06Q 30/06 |
| 2022/0309491 A1* | 9/2022 | Shapiro ............... | G06Q 30/08 |
| 2023/0033434 A1* | 2/2023 | Giang ................ | G06Q 20/4016 |
| 2023/0073859 A1* | 3/2023 | Matthews .......... | G06Q 30/0641 |

FOREIGN PATENT DOCUMENTS

| | | | | |
|---|---|---|---|---|
| AU | 2020351764 A1 | 4/2022 | | |
| KR | 102423989 B1 * | 7/2022 | ............. | G06Q 20/36 |
| WO | WO-2021/242809 A | 12/2021 | | |

OTHER PUBLICATIONS

Chunming Rong, Managing Digital Objects with Decentralized Identifiers based on NFT like Schema, 2022 (Year: 2022).*
International Search Report and Written Opinion issued by the International Searching Authority in PCT Application No. PCT/US2023/020514, Aug. 1, 2023, 19 pages.
Wikipedia: "Exif," Jul. 14, 2012, 10 pages.

* cited by examiner

*Primary Examiner* — Calvin L Hewitt, II
*Assistant Examiner* — Gregory M James
(74) *Attorney, Agent, or Firm* — Foley & Lardner LLP

(57) ABSTRACT

Systems, methods, and computer-readable storage media to model objects. One method includes receiving, from an application of a user device, a content dataset of an object and capture event parameters of a capture event of the object, generating a three-dimensional (3D) object file based on the content dataset, wherein the 3D object file is a digital twin of the object, corresponding with one or more characteristics of the object, storing the 3D object file and the capture event parameters in a data repository, generating a token including a metadata object based on broadcasting the 3D object file, the content dataset, and the capture event parameters to a distributed ledger, wherein the metadata objects embeds, into the token, the metadata of the object, a pointer to the capture event parameters, and a pointer to the 3D object file, and storing the token at a digital wallet address of a wallet storage.

18 Claims, 4 Drawing Sheets

OBJECT DIGITIZATION UTILIZING TOKENS

TECHNICAL FIELD

The present implementations relate generally to assets, and more particularly to tokens.

BACKGROUND

The present disclosure relates generally to assets, and more particularly to tokens. In a computer networked environment such as the internet, users and entities such as people or companies may desire to create digital assets.

SUMMARY

Some arrangements relate to a system to model objects, the system includes a data processing system including memory and one or more processors. The one or more processors are configured to receive, from an application of a user device, a content dataset of an object and capture event parameters of a capture event of the object, wherein the content dataset includes overlapping content of the object captured and associated metadata of the object, generate a three-dimensional (3D) object file based on the content dataset, wherein the 3D object file is a digital twin of the object, corresponding with one or more characteristics of the object, store the 3D object file and the capture event parameters in a data repository, generate a token including a metadata object based on broadcasting the 3D object file, the content dataset, and the capture event parameters to a distributed ledger, wherein the metadata objects embeds, into the token, the metadata of the object, a pointer to the capture event parameters, and a pointer to the 3D object file, and store the token at a digital wallet address of a wallet storage of the user device.

In some arrangements, the one or more processors further configured to in response to receiving a transfer request on the distributed ledger, calculate a payment amount associated with a royalty of a curator according to the metadata object of the token, and distribute the payment according to the payment amount to a curator wallet address associated with the curator.

In some arrangements, the one or more processors further configured to extract the metadata of the object based on analyzing the content dataset and capture event parameters, wherein the metadata include historical data, provenance data, appraisal data, and authentication data, and wherein the metadata is stored in the metadata object of the token as a digital signature that links the metadata to the 3D object file.

In some arrangements, the one or more processors further configured to determine additional processing to perform on the 3D object file based on one or more 3D object file parameters, wherein the 3D object files parameters include at least one of a resolution, a level of detail, a file format compatibility, a texture mapping, or a surface normal adjustments, and re-generate the 3D object file of the object by applying the additional processing to the 3D object file.

In some arrangements, the one or more processors further configured to receive, from a third-party computing system, a verifiable credential request associated with an authenticator, authorize the authenticator based on analyzing and cross-referencing information of the authenticator with at least one of the metadata of the object or the capture event, generate a digital identifier linked to an identity of the authenticator, generate verifiable credentials corresponding to the digital identifier, wherein the verifiable credential include verifiable data of the metadata of the object or the capture event, embed the verifiable credentials into the 3D object file, broadcast the verifiable credentials to the distributed ledger, and provide the digital identifier to the third-party computing system.

In some arrangements, each of a plurality of digital identifiers is uniquely assigned to and cryptographically secured for each authenticator of a plurality of authenticators, and wherein each of the plurality of digital identifiers are configured to enable each authenticator of the plurality of authenticators to digitally sign one or more portions of the metadata of the object.

In some arrangements, the one or more processors validate the one or more portions of the metadata in response to receiving a combination of the digital identifier and a digital signature of the one or more portions of the metadata.

In some arrangements, the one or more processors further configured to determine an authentication agent of the object based on the capture event and a plurality of environmental information including at least one of a physical object origin, a physical object category, a physical object value, a physical object rarity, collect authentication agent information associated with the authentication agent and including at least one of an agent's identity, an agent's qualifications, an agent's areas of expertise, a date and time of authentication, and agent notes, and update, using a private key corresponding to the digital wallet address of the wallet storage of the user device, the metadata object of the token to further include authentication agent information.

In some arrangements, the content dataset includes at least one or more captured images, videos, or audio of the object, and wherein the capture event parameters include at least a date, time, location, parties present or involved, and environmental conditions of the capture event, and wherein generating the token includes minting a non-fungible token (NFT) using the metadata of the object.

In some arrangements, the one or more processors further configured to present, via the application of the user device, the 3D object file including adjustable content, wherein upon selection of a portion of the adjustable content, the application is configured to adjust one or more features of the 3D object file.

In some arrangements, herein broadcasting includes encoding the 3D object file, the content dataset, and the capture event parameters, signing the encoded 3D object file, content dataset, and capture event parameters with a private key corresponding to the digital wallet address of the wallet storage of the user device, transmitting the signed 3D object file, content dataset, and capture event parameters to a network of nodes participating in the distributed ledger, wherein the nodes independently validate the 3D object file, content dataset, capture event parameters, and the associated signature to confirm authenticity, integrity, and compliance with consensus rules of the network of nodes, and incorporating the token into a new block of exchanges, wherein the new block appends to an existing chain of blocks in the distributed ledger.

Some arrangements relate to a method to model objects. The method including receiving, by one or more processing circuits from an application of a user device, a content dataset of an object and capture event parameters of a capture event of the object, wherein the content dataset includes overlapping content of the object captured and associated metadata of the object, generating, by the one or more processing circuits, a three-dimensional (3D) object file based on the content dataset, wherein the 3D object file is a digital twin of the object, corresponding with one or more characteristics of the object, storing, by the one or more processing circuits, the 3D object file and the capture event parameters in a data repository, generating, by the one or more processing circuits, a token including a metadata object based on broadcasting the 3D object file, the content dataset, and the capture event parameters to a distributed ledger, wherein the metadata objects embeds, into the token, the metadata of the object, a pointer to the capture event parameters, and a pointer to the 3D object file, and storing, by the one or more processing circuits, the token at a digital wallet address of a wallet storage of the user device.

In some arrangements, the method further includes in response to receiving a transfer request on the distributed ledger, calculating, by the one or more processing circuits, a payment amount associated with a royalty of a curator according to the metadata object of the token, and distributing, by the one or more processing circuits, the payment according to the payment amount to a curator wallet address associated with the curator.

In some arrangements, the method further includes extracting, by the one or more processing circuits, the metadata of the object based on analyzing the content dataset and capture event parameters, wherein the metadata include historical data, provenance data, appraisal data, and authentication data, and wherein the metadata is stored in the metadata object of the token as a digital signature that links the metadata to the 3D object file.

In some arrangements, the method further includes determining, by the one or more processing circuits, additional processing to perform on the 3D object file based on one or more 3D object file parameters, wherein the 3D object files parameters include at least one of a resolution, a level of detail, a file format compatibility, a texture mapping, or a surface normal adjustments, and re-generating, by the one or more processing circuits, the 3D object file of the object by applying the additional processing to the 3D object file.

In some arrangements, the method further includes receiving, by the one or more processing circuits from a third-party computing system, a verifiable credential request associated with an authenticator, authorizing, by the one or more processing circuits, the authenticator based on analyzing and cross-referencing information of the authenticator with at least one of the metadata of the object or the capture event, generating, by the one or more processing circuits, a digital identifier linked to an identity of the authenticator, generating, by the one or more processing circuits, verifiable credentials corresponding to the digital identifier, wherein the verifiable credential include verifiable data of the metadata of the object or the capture event, embedding, by the one or more processing circuits, the verifiable credentials into the 3D object file, broadcast, by the one or more processing circuits, the verifiable credentials to the distributed ledger, and providing, by the one or more processing circuits, the digital identifier to the third-party computing system.

In some arrangements, each of a plurality of digital identifiers is uniquely assigned to and cryptographically secured for each authenticator of a plurality of authenticators, and wherein each of the plurality of digital identifiers are configured to enable each authenticator of the plurality of authenticators to digitally sign one or more portions of the metadata of the object.

In some arrangements, the method further includes determining, by the one or more processing circuits, an authentication agent of the object based on the capture event and a plurality of environmental information including at least one of a physical object origin, a physical object category, a physical object value, a physical object rarity, collecting, by the one or more processing circuits, authentication agent information associated with the authentication agent and including at least one of an agent's identity, an agent's qualifications, an agent's areas of expertise, a date and time of authentication, and agent notes, and updating, by the one or more processing circuits using a private key corresponding to the digital wallet address of the wallet storage of the user device, the metadata object of the token to further include authentication agent information.

Some arrangements relate to a non-transitory computer readable medium including one or more instructions stored thereon and executable by at least one processor to receive, from an application of a user device, a content dataset of an object and capture event parameters of a capture event of the object, wherein the content dataset includes overlapping content of the object captured and associated metadata of the object, generate a three-dimensional (3D) object file based on the content dataset, wherein the 3D object file is a digital twin of the object, corresponding with one or more characteristics of the object, store the 3D object file and the capture event parameters in a data repository, generate a token including a metadata object based on broadcasting the 3D object file, the content dataset, and the capture event parameters to a distributed ledger, wherein the metadata objects embeds, into the token, the metadata of the object, a pointer to the capture event parameters, and a pointer to the 3D object file, store the token at a digital wallet address of a wallet storage of the user device.

In some arrangements, additional instructions are stored thereon and executable by the at least one processor further to in response to receiving a transfer request on the distributed ledger, calculate a payment amount associated with a royalty of a curator according to the metadata object of the token, and distribute the payment according to the payment amount to a curator wallet address associated with the curator

BRIEF DESCRIPTION OF THE DRAWINGS

These and other aspects and features of the present implementations will become apparent to those ordinarily skilled in the art upon review of the following description of specific implementations in conjunction with the accompanying figures, wherein.

Figure 1:
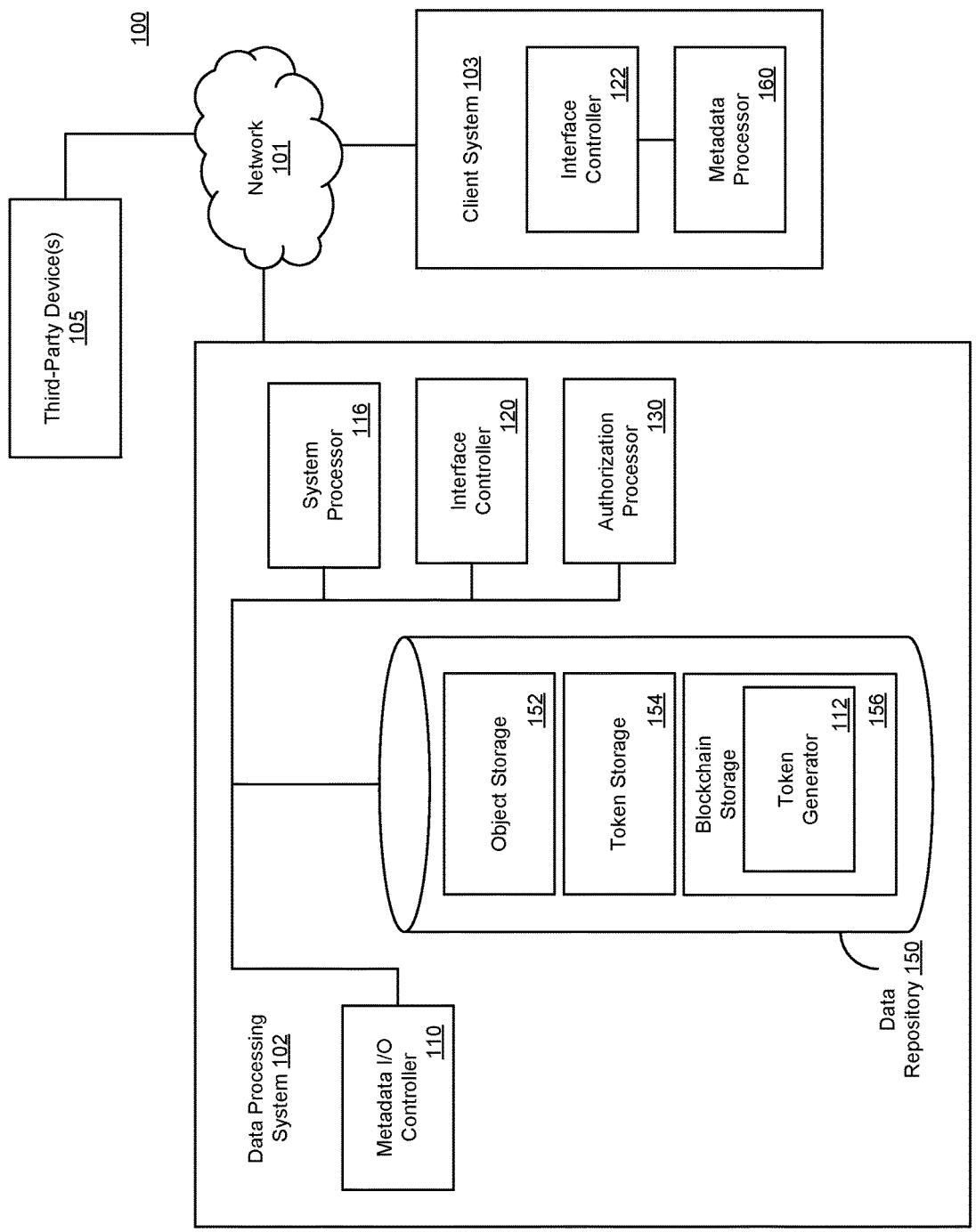
FIG. 1 illustrates a block diagram depicting an implementation of a system for modeling objects, according to some arrangements.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

In general, this technical solution provides improvements in the fields of photogrammetry, generative modeling, neural radiance fields, distributed ledger technology (DLT), digital identifiers, verifiable credentials, and virtual environments. In some arrangements, the systems and methods implement generating digital twins for physical, non-digitally native objects, enabling these objects to be represented digitally in virtual environments or augmented reality implementations. Additionally, the systems and methods implement the digital documentation of the asset, potentially including authentication, appraisal, and title services through the provision of digital verifiable credentials. In some arrangements, information and data of the capture event can be recorded on a public distributed ledger, with information and data stored in NFT metadata.

In some arrangements, the systems and methods implement generating digital twins not only for physical, non-digitally native objects but also for spaces or environments, enabling these spaces to be represented digitally in virtual environments or augmented reality implementations. This can be particularly beneficial for architectural, urban planning, and heritage preservation purposes, as well as for creating immersive virtual experiences for users. By digitizing spaces or environments, users can explore and interact with these digital twins in ways that were previously not possible, such as simulating different design layouts, visualizing historical changes, or conducting virtual tours. Moreover, the systems and methods implement the digital documentation of the photogrammetry process for these spaces, potentially including authentication, appraisal, and title services through the provision of digital verifiable credentials. This can ensure that the digital twins of spaces are accurate, trustworthy, and easily traceable to their real-world counterparts. In some arrangements, information and data of the capture event for these spaces can be recorded on a public distributed ledger, with information and data stored in NFT metadata.

In various arrangements, digitally twinning objects (or spaces) to create digital objects can be used in augmented reality implementations, allowing for life-sized, digital versions of objects to be viewed in any environment. Additionally, NFTs are cryptographic assets on a blockchain with unique identification codes and metadata, distinguishing them from one another. In some arrangements, NFTs can be associated with and represent digitally native assets such as digital artwork. The systems and methods can use digital twinning and NFTs to create a comprehensive solution for digitizing objects, while ensuring their authenticity and provenance. By integrating photogrammetry (e.g., or NeRF and AI model generation), distributed ledger technology, digital identifiers, and verifiable credentials, the systems and methods offers an improved implementation to create digital twins for objects, bridging the gap between the physical (or artificial) and digital realms.

Furthermore, the implementation of digital twinning and NFTs not only enables objects (e.g., physical or artificial, and for the sake of simplicity, hereafter when referring to objects, whether they are physical or artificial, will use the term "physical") to be represented digitally in virtual environments and augmented reality settings, but also allows for the secure and transparent recording of the capture event, authentication, appraisal, and other relevant details. As a result, the implementations improve the overall process of creating, managing, and preserving digital representations of physical objects, provides new application and uses for asset management, display, and preservation in the digital age. By using digital identifiers and verifiable credentials in conjunction with distributed ledger technology, it offers a secure, trustless method for documenting identity and proof of action. Thus, the systems and methods described herein can provide documentation and help prove authenticity of physical objects, while including scarcity, provenance, history, manufacturer, designer, appraisal, and other notable attributes, preserving the physical objects in an immutable digital form indefinitely as recorded on a public distributed ledger or blockchain. In some arrangements, the systems and methods implement a process for 3D digital objects to be represented in a form compatible with and connected to a distributed ledger, such that it can be transformed into a NFT within an application or online.

In current systems, a comprehensive solution for integrating physical objects into the digital world and harnessing the advantages of distributed ledger technology is absent, which restricts the ability to seamlessly interact in a virtually immersive environment. The systems and methods described herein addresses this gap by providing a unified process that combines photogrammetry, digital identifiers, verifiable credentials, and distributed ledger technology to create a secure, transparent, and immutable digital representations of physical objects. By bridging this gap, the implementation enables a robust and reliable method for digitizing physical objects, verifying their authenticity, and preserving their provenance. This not only improves the integration of physical objects into the digital world but also enables using distributed ledger technology to ensure the security and transparency of the digital twins. As a result, stakeholders such as collectors, museums, and insurers can confidently access and interact with digital representations of valuable and scarce objects, knowing that the information is accurate, secure, trustworthy, and up-to-date. Thus, the implementations provide a secure and reliable ecosystem for the preservation and authentication of physical objects in the digital domain, ultimately expanding the scope and potential of both the physical and digital using a virtually immersive environment (i.e., bridging the physical world to the digital world).

FIG. 1 illustrates a system in accordance with present implementations. As illustrated by way of example in FIG. 1, an example system 100 can include a network 101, a data processing system 102, and a client system 103. The network 101 can be any type or form of network. The geographical scope of the network 101 can vary widely and the network 101 can be a body area network (BAN), a personal area network (PAN), a local-area network (LAN), e.g., Intranet, a metropolitan area network (MAN), a wide area network (WAN), or the Internet. The topology of the network 101 can be of any form and can include, e.g., any of the following: point-to-point, bus, star, ring, mesh, or tree. The network 101 can be an overlay network which is virtual and sits on top of one or more layers of other networks 101. The network 101 can be of any such network topology as known to those ordinarily skilled in the art capable of supporting the operations described herein. The network 101 can utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite can include application layer, transport layer, internet layer (including, e.g., IPv6), or the link layer. The network 101 can be a type of a broadcast network, a telecommunications network, a data communication network, or a computer network. The data processing system 102 can include a metadata input and output (I/O) controller 110, a token generator 112, a system processor 116, an interface controller 120, an authorization processor 130, and a data repository 150. The client system 103 can include a computing system located remotely from the data processing system 102. The client system 103 can include an interface controller 122 and a metadata processor 160. The third-party devices 105 can include a computing system located remotely from the data processing system 102.

The data processing system 102 can implement an improved architecture that streamlines and enhances the entire process of capturing a physical object using photogrammetry, verifying its authenticity through the expertise of leading professionals in the field (if desired or requested), and minting it as a distinct NFT on a public distributed ledger or blockchain. This end-to-end architecture harnesses the power of verifiable credentials, allowing experts to attest to the object's authenticity, history, and other pertinent attributes securely and transparently. By seamlessly integrating photogrammetry, expert authentication, and blockchain technology, the data processing system 102 establishes a robust, transparent, and secure framework for preserving, managing, and transacting both physical objects and their digital twins. This improved architecture provides accurate representations and documentation of valuable objects, instilling confidence among collectors, investors, and other stakeholders in the art and collectibles ecosystem.

The metadata I/O controller 110 can obtain one or more object files including metadata objects. The metadata I/O controller 110 can communicate with one or more external systems via the network 101, and can obtain one or more object files and/or metadata objects via the network 101. The metadata I/O controller 110 can generate object files and/or metadata objects based on one or more output criteria that can be transmitted to a computing device, including, for example, the client system 103 or third-party device 105.

The metadata I/O controller 110 can identify one or more characteristics of an object file. A characteristic can include, for example, a data type, an output data type, an input data type, or any combination thereof. For example, the metadata I/O controller 110 can obtain and identify metadata objects including video, audio, text, any media, executable programs, or any combination thereof. The metadata I/O controller 110 can transmit one or more of metadata objects, object files (e.g., 2D and 3D), or references or links with one or more metadata objects or object files to the token generator 112. In some arrangements, the object files and metadata objects can be stored by the metadata I/O controller 110 in object storage 152. In some arrangements, the client system 103, executing by the metadata processor 160, can perform the operations of digital twinning of captured physical objects. In various arrangements, the client system 103, executing by the interface controller 112, can provide captured content data and metadata of the physical object including event parameters of a capture event (e.g., when the physical object was captured and the details and data regarding the event).

Referring generally to digital twinning, the metadata I/O controller 110 can receive metadata (e.g., including a content dataset of a physical object and capture event parameters of a capture event of the physical object). The metadata I/O controller 110 can process a set of images to create a 3D digital twin object file representing a physical object. The metadata I/O controller 110 is implemented to generate a 3D digital twin object file efficiently and accurately, preserving the authenticity, details, and visual characteristics of the physical object. In general, the metadata I/O controller 110 can include multiple sub-circuits or processing circuit configured to execute instruction to perform various tasks of the data processing system 102. However, it should be understood that while the various circuits are described individually, each circuit or processor can be combined to perform various tasks and execute various instructions.

The metadata I/O controller 110 can include an image input processing circuit configured to receive a set of images capturing different perspectives of the physical object. The image input module may accept various image formats, such as JPEG, PNG, or TIFF, and may be adapted to handle images captured by different devices, such as cameras, smartphones, or other imaging devices. The metadata I/O controller 110 can include an input processing sub-circuit configured to receive a content dataset and capture event parameters from an application of a user device. The content dataset can include a set of images capturing different perspectives of the physical object, while the capture event parameters may include information such as capture time, location, and device details. Various image formats may be accepted, such as JPEG, PNG, or TIFF, and the input processing sub-circuit can be adapted to handle images captured by different devices, such as cameras, smartphones, or other imaging devices.

The metadata I/O controller 110 can further include a 3D object file generation processing sub-circuit that processes the content dataset and capture event parameters to create a 3D digital twin object file. This sub-circuit may employ various 3D modeling techniques, such as photogrammetry, structure from motion, or others, to generate an accurate and detailed 3D representation of the physical object. The 3D object file generation processing sub-circuit may employ various feature detection algorithms, such as SIFT, SURF, ORB, or other suitable methods, to ensure accurate and robust feature detection across different imaging conditions and object types. In addition, the metadata I/O controller 110 can further include a metadata generation processing sub-circuit that extracts and processes relevant metadata from the content dataset and capture event parameters. The extracted metadata may be stored in metadata objects and can include information about the physical object, such as its dimensions, material properties, and unique identifiers, as well as data related to the capture event, such as the capturing agent, authentication agent, and remarks.

In some arrangements, the metadata I/O controller 110 can further include a 3D object file generation processing sub-circuit that processes the content dataset and capture event parameters to create a 3D digital twin object file of a space or environment. This sub-circuit may employ various 3D modeling techniques, such as photogrammetry, structure from motion, or others, to generate an accurate and detailed 3D representation of the physical space or environment. The 3D object file generation processing sub-circuit may employ various feature detection algorithms, such as SIFT, SURF, ORB, or other suitable methods, to ensure accurate and robust feature detection across different imaging conditions and space or environment types. In addition, the metadata I/O controller 110 can further include a metadata generation processing sub-circuit that extracts and processes relevant metadata from the content dataset and capture event parameters. The extracted metadata may be stored in metadata objects and can include information about the space or environment, such as its dimensions, material properties, and unique identifiers, as well as data related to the capture event, such as the capturing agent, authentication agent, and remarks.

In a specific example, assume the digital twinning is of an art gallery space. The content dataset and capture event parameters could include high-resolution images or videos, captured from various angles and positions within the gallery. These images or videos would contain information about the dimensions of the space, the arrangement and placement of walls, the layout and design of the floor, and the locations of doors, windows, and other architectural elements. In addition, the content dataset would also capture the objects within the space, such as artwork displayed on the walls, sculptures placed on pedestals, and any furniture or fixtures present. The metadata extracted from the content dataset could include the dimensions of each artwork, the artist's name, the creation date, and any associated provenance information. Similarly, metadata regarding the sculptures, furniture, and fixtures could encompass their dimensions, materials, manufacturers, and any relevant historical data. In some arrangements, the metadata generation processing sub-circuit would process this information to create a comprehensive set of metadata objects that describe the physical space and its contents in detail. The 3D object file generation processing sub-circuit would then use the content dataset and metadata to construct an accurate and detailed 3D digital twin of the art gallery space, complete with all the architectural elements, artwork, sculptures, and furniture present in the physical environment. This digital twin would enable users to explore and interact with the art gallery in a virtual or augmented reality setting, enhancing their experience and understanding of the space and its contents.

The metadata I/O controller 110 can also include an output processing sub-circuit that stores the generated 3D digital twin object file and its associated metadata in object storage 152 of data repository 150. This sub-circuit may save the 3D object file in various formats, such as OBJ, STL, or GLTF, and may store the metadata as a separate file or embed it within the 3D object file. The output processing sub-circuit may also facilitate sharing, transferring, or exporting the 3D digital twin object file and its metadata to other applications, devices, platforms, or within data processing system 102. A feature matching processing sub-circuit can be included in the metadata I/O controller 110 to establish correspondences between the detected features across the set of input images. The feature matching processing sub-circuit may utilize various matching algorithms, such as brute-force matching, FLANN-based matching, or others, to establish accurate and reliable feature correspondences. The metadata I/O controller 110 may also include a 3D reconstruction processing sub-circuit that combines the feature correspondences and the geometric information from the input images to create a 3D point cloud representing the physical object. The 3D reconstruction processing sub-circuit may implement various 3D reconstruction techniques, such as bundle adjustment, multi-view stereo, or others, to generate a dense and accurate 3D point cloud. A mesh generation processing sub-circuit can also be provided within the metadata I/O controller 110 to convert the 3D point cloud into a 3D mesh model, which can serve as the basis for the 3D digital twin object file. The mesh generation processing sub-circuit may employ various meshing algorithms, such as Poisson surface reconstruction, Delaunay triangulation, or others, to create a high-quality 3D mesh that accurately represents the geometry and surface properties of the physical object.

In some arrangements, the metadata I/O controller 110 can further include a texture mapping processing sub-circuit that applies the texture information from the input images onto the 3D mesh model, resulting in a realistic and visually consistent 3D digital twin object file. The texture mapping processing sub-circuit may utilize various texture mapping techniques, such as projective texture mapping, UV mapping, or others, to ensure proper texture alignment and seamless blending across the 3D mesh model. In some arrangements, the metadata I/O controller (110) may include additional processing sub-circuits or components, such as a quality assessment processing sub-circuits for evaluating the accuracy and visual quality of the generated 3D digital twin object file, a user interface processing sub-circuit for providing user interaction and control during the generation process, or a communication processing sub-circuit for interacting with other systems or services, such as distributed ledgers (e.g., blockchain storage 156) or authentication systems (e.g., authorization processor 130).

The metadata I/O controller 110 can receive and process the captured physical object and associated data from the client system 103 or third-party device 105. When the metadata I/O controller 110 receives a content dataset and capture event parameters, it initiates the photogrammetry process by obtaining multiple overlapping photographs of the object taken from various angles. The controller then uses algorithms and computer vision techniques to process these photographs, ultimately generating a detailed and accurate three-dimensional digital representation of the object, known as its digital twin or object file (or 3D object file). Once the digital twin has been created, the metadata I/O controller 110 proceeds to integrate the photogrammetry-derived information with distributed ledger or blockchain technology. This integration process may involve creating a unique hash of the digital twin and its metadata, which can include the object's history, provenance, and other relevant attributes. The controller then stores this hash, along with the metadata, on a distributed ledger or blockchain (e.g., blockchain storage 156), ensuring a secure and transparent record of the object's information.

It should be understood that while photogrammetry can be used as a method for generating a detailed and accurate three-dimensional digital representation of the object, known as its digital twin or object file (or 3D object file), there are additional arrangements that can be implemented. For example, NeRF (Neural Radiance Fields), is a technique that leverages machine learning to create a continuous 3D representation of a scene from a set of 2D images. NeRF algorithms can train a neural network to represent the scene as a continuous function, which can then be used to generate novel views of the object from different angles. Similarly, other methods such as volumetric reconstruction, structured light scanning, and time-of-flight imaging can also be employed to generate 3D object files, depending on the specific requirements and constraints of the application. Once the digital twin has been created using photogrammetry or an alternative method, the metadata I/O controller 110 proceeds to integrate the 3D reconstruction-derived information with distributed ledger or blockchain technology. This integration process may involve creating a unique hash of the digital twin and its metadata, which can include the object's history, provenance, and other relevant attributes.

In addition to generating the digital twin and integrating it with distributed ledger or blockchain technology, the metadata I/O controller 110 can also document and record the conditions of the photogrammetry event. This includes information such as the date, time, location, and parties involved in the capture process. The controller ensures that this information is securely and accurately recorded on a distributed ledger or blockchain, such as the blockchain storage 156. This immutable record serves as a reliable reference for the object's digital capture, providing a verifiable and tamper-proof history. By maintaining this comprehensive record, the metadata I/O controller 110 adds an additional layer of trust and transparency to the digital twin's associated information. Stakeholders, such as collectors, investors, and experts, can confidently rely on this recorded data to verify the authenticity and accuracy of the digital twin and its associated metadata, further enhancing the overall trust and confidence in the ecosystem of valuable objects and their digital counterparts.

In general, the token generator 112, integrated within the distributed ledger of the blockchain storage 156, can mint a non-fungible token (NFT) associated with the digital twin. This NFT can include a reference to the metadata object stored on the blockchain or distributed ledger, further solidifying the connection between the digital twin and the authoritative attestations provided by the agents. Once the object has been transformed into a 3D file through photogrammetry (or another process) and its associated capture event details have been recorded on a distributed ledger or blockchain, the integrated token generator 112 initiates the NFT minting process. During this process, the token generator 112 creates a unique and indivisible NFT on a distributed ledger or blockchain. This NFT serves as a digital certificate of ownership and authenticity for the physical object, effectively linking the digital twin with its real-world counterpart. To ensure that the NFT contains all the relevant information related to the object, the token generator 112 embeds pertinent details, such as the object's history, provenance, appraisal, and other attributes, within the NFT's metadata. Furthermore, the metadata object generated by the token generator 112 points to the photogrammetry capture event details previously recorded on the distributed ledger or blockchain.

Referring to the token generator 112 in more detail, it can be integrated within a distributed ledger of the blockchain storage 156 and can generate one or more non-fungible tokens (NFTs) linked to particular metadata of the object obtained from the metadata I/O controller 110. The object files and associated metadata objects can be stored in object storage 152. In some arrangements, the metadata I/O controller 110 can generate and provide the 3D object file, the content dataset, and the capture event parameters to the token generator 112 for minting. The token generator 112 can generate a token corresponding to particular metadata object. In some arrangements, the token generator 112 can obtain a preexisting token and can assign the preexisting token to a particular metadata object.

The token generator 112 can generate a non-fungible token that is unique against all other tokens generated by the token generator 112 to identify object files and metadata objects, a fungible token that can be generated or replicated an arbitrary number of times, and a semi-fungible token that can be generated or replicated a particular number of times below or meeting a particular replication threshold. One or more fungible tokens or semi-fungible tokens can, for example, be associated with a particular object or the same object. The token generator 112 can access the token storage 154 to determine whether the replication threshold corresponding to a particular threshold is satisfied, and can block or forgo generation or replication of a token beyond or meeting the replication threshold in response to a determination that the replication threshold corresponding to a particular threshold is satisfied. The token generator 112 can 3D object files, content datasets, and capture event parameters from the metadata I/O controller 110, and can store one or more non-fungible tokens, fungible tokens, or semi-fungible tokens on a distributed ledger.

The system processor 116 can execute one or more instructions associated with the system 100. The system processor 116 can include an electronic processor, an integrated circuit, sub-circuits, or the like including one or more of digital logic, analog logic, digital sensors, analog sensors, communication buses, volatile memory, nonvolatile memory, and the like. The system processor 116 can include, but is not limited to, at least one microcontroller unit (MCU), microprocessor unit (MPU), central processing unit (CPU), graphics processing unit (GPU), physics processing unit (PPU), embedded controller (EC), or the like. The system processor 116 can include a memory operable to store or storing one or more instructions for operating components of the system processor 116 and operating components operably coupled to the system processor 116. The one or more instructions can include at least one of firmware, software, hardware, operating systems, embedded operating systems, and the like. The system processor 116 or the system 100 generally can include at least one communication bus controller to effect communication between the system processor 116 and the other elements of the system 100.

The token generator 112, integrated within a distributed ledger of the blockchain storage 156, can generate one or more smart contracts that are executable to restrict output of one or more particular object files based on one or more metadata objects. The system processor 116, for example, can execute smart contracts generated by the token generator 112. The token generator 112 can obtain one or more object files and/or metadata objects and can generate a control structure corresponding to the object files or metadata objects. For example, the token generator 112 can generate a control structure (e.g., metadata control structure) to encapsulate a plurality of object files each associated with a particular metadata characteristic. The control structure can restrict access to the object file and/or metadata objects within the control structure, by an encapsulation layer that, for example, encrypts all object files within the control structure with a common encryption scheme. The encapsulation layer can control output of multiple object files within the control structure by uniformly and concurrently decrypting the metadata objects according to the common encryption scheme. A metadata characteristic can include a type of output, a magnitude associated with the output, or any combination thereof, for example. For example, the metadata characteristic can include a periodic value increase in a metric of the object file, or can include a media type associated with a media object. A media type can include, for example, video, audio, text, or any combination thereof. The token generator 112 can store one or more control structures encapsulating one or more object files in the token storage 154.

The token generator 112 can generate a smart contract based on one or more tokens and control structures. The token generator 112 can generate a smart contract including one or more executable instructions to restrict or transmit output of one or more object files encapsulated within a particular control structure. The token generator 112 can generate a smart contract that can conditionally transmit output of one or more of the object files in response to detection of one or more attributes for outputting being satisfied (and/or verifying the authenticity of at least a portion of the physical asset). The tokens can include one or more non-fungible tokens, fungible tokens, and semi-fungible tokens. The token generator 112 can store the smart contract to the token storage 154, and can link a token to the smart contract. The token generator 112 can publish, post, or append, for example, the token linked to the smart contract to a blockchain, and can publish, post, or append, for example, one or more tokens corresponding to the smart contract to a blockchain.

In some arrangements, the token generator 112 can generate alternative (or combinational) mechanisms for managing the access and control of digital twins based on one or more tokens and control structures. In one example, the token generator 112 can create a decentralized autonomous organization (DAO) that governs the usage and access rights to the digital twin content. The DAO would be composed of token holders who can vote on proposals for modifying access conditions or sharing revenue generated from the digital twin. In another example, the token generator 112 can implement a multi-signature (multisig) scheme, where multiple parties must provide their signatures for the execution of certain actions related to the digital twin. This could include granting access to the digital twin, updating metadata, or transferring ownership. The multisig scheme enhances the security and trustworthiness of the digital twin management process. The tokens involved in these alternative (or combinational) mechanisms can include one or more non-fungible tokens, fungible tokens, and semi-fungible tokens. The token generator 112 can store the related data or agreements to the token storage 154 and can link a token to the implemented mechanism. The token generator 112 can publish, post, or append the token linked to the chosen mechanism to a blockchain, and can publish, post, or append one or more tokens corresponding to the mechanism to a blockchain.

The interface controller 120 can link the data processing system 102 with one or more of the network 101, the client system 103, and the third-party device 105 by one or more communication interfaces. A communication interface can include, for example, an application programming interface ("API") compatible with a particular component of the data processing system 102 or the data processing system 102. The communication interface can provide a particular communication protocol compatible with a particular component of the data processing system 102 and a particular component of the client system 103. The interface controller 120 can be compatible with particular object files, metadata objects, and can be compatible with particular object file delivery systems corresponding to particular object files. For example, the interface controller 120 can be compatible with transmission of video object files, audio object files, image object files, or any combination thereof. For example, the interface controller 120 can be compatible with payment processing transmissions by a protocol compatible with payment processing latency and encryption structures.

The authorization processor 130 can validate one or more tokens against one or more smart contracts to ensure the authenticity and provenance of the 3D digital twin object files. By obtaining one or more tokens and comparing them to the tokens requested by a particular smart contract, the authorization processor 130 can determine whether a specific token is compatible with a specific smart contract. This determination is made by detecting if a particular token matches a specific token characteristic associated with a particular smart contract. For example, the authorization processor 130 can identify that a token is compatible with a smart contract by comparing a hash of the token with a hash included in the smart contract.

In some arrangements, the authorization processor 130 provides an implementation to verify the authenticity of a physical object captured via photogrammetry by utilizing digital proofs from qualified parties. These parties possess verifiable credentials associated with a digital identifier (e.g., decentralized identifier (DID)), which can attest to their expertise and the legitimacy of their authentication process. This approach ensures a higher level of trust and confidence in the object's authenticity, provenance, and overall value. In some arrangements, the authorization processor 130 generates an authorization indication based on its determinations. In response to the authorization indication, the authorization processor 130 may provide a control structure or one or more object files or metadata objects to the client system 103 or third-party devices 105 by decrypting the encapsulation layer of the control structure.

Furthermore, the authorization processor 130 can execute the smart contract with the compatible tokens to retrieve a specific object file or metadata for the smart contract or a reference to the particular object file or metadata from the object storage 152. This process ensures that the digital proof of authentication provided by the qualified party is securely and accurately integrated with the 3D digital twin object file, thereby enhancing the overall credibility and reliability of the system. In some arrangements, the authorization processor 130 can validate one or more tokens against one or more smart contracts. The authorization processor 130 can obtain one or more tokens, and can compare one or more token to one or more tokens requested by a particular smart contract. The authorization processor 130 can detect whether a particular token is compatible with a particular smart contract by detecting whether a particular token matches a particular token characteristic associated with a particular smart contract. For example, the authorization processor 130 can detect that a token is compatible with a smart contract based on comparing a hash of the token with a hash included in the smart contract.

In some arrangements, the authorization processor 130 can generate an authorization indication based on one or more determinations, and can transmit the authorization indication to the another system in the data processing system 102 or externally (e.g., to the client system 103 or third-party devices 105). The authorization processor 130 can, for example, provide an object file, NFT, or one or more metadata objects, in response to the authorization indication, by decrypting the encapsulation layer of the control structure. The authorization processor 130 can, for example, execute the smart contract with the compatible tokens to retrieve a particular object file for the smart contract, or a reference to the particular control structure, from the token storage 154.

The authorization processor 130 can execute one or more actions in response to an authorization indication generated by the authorization processor 130. The authorization processor 130 can, for example, provide output from particular object file within a particular control structure, in response to receiving a token or reference to a token. In some arrangements, the process incorporates the use of digital identifiers to involve various parties who can attest to specific details associated with the photogrammetry capture event, the object's attributes, and other aspects or features of the physical object that was digitalized. These parties may include experts in the object's field who can vouch for the object's authenticity, historical significance, provenance, sales history, and ownership history. Appraisal agents, insurance agents, or other professionals may also provide information related to the object.

In some arrangements, the use of digital identifiers allows these agents to offer verifiable credentials linked to one or more digital identifiers, ensuring a high level of trust and confidence in their inspection or review of the object and the information associated with it. The authorization processor 130 manages these digital identifiers, ensuring that the agents' credentials are secure, trustworthy, and traceable, adding an extra layer of reliability to the entire process. This information, including the agents' attestations, can be recorded in connection with the photogrammetry capture event (e.g., stored in metadata). The token generator 112 then creates a non-fungible token (NFT) with corresponding metadata that references this recorded information, further solidifying the connection between the digital twin and the authoritative attestations provided by the agents.

The integration of digital identifiers and verifiable credentials in the process, managed by the authorization processor 130, ensures a high degree of confidence in the authenticity and accuracy of the information surrounding the physical object and its digital twin. This approach promotes transparency and trust in the ecosystem, fostering an environment where collectors, artists, and other stakeholders can confidently engage with and explore the world of valuable objects and their digital counterparts.

In some arrangements, the object undergoing digital capture via photogrammetry is inspected by leading experts in the object's field. After the inspection, the expert authenticator may provide verifiable credentials linked to a digital identifier, attesting to their presence and approval at the capture event. For example, the digital identifier can be a decentralized identifier (DID) that can be a unique identifier, containing information about the identify of an individual. In some arrangements, the verifiable credentials (VCs) can be used to store and represent the machine-readable credentials. In the above example, the authorization processor 130 can generate a template doc (e.g., DID document) that is issued to a user that can be populated with identification information of the user (i.e., where the DID would reference the DID document).

In some arrangements, the digital identifier can serve as a unique and verifiable credential to authenticate and represent a user, asset, or entity within a digital environment. In the context of NFTs, digital identifiers can be used to associate a creator, owner, or other relevant parties with the digital asset or token. For example, a digital identifier might be a unique alphanumeric code, a public key in a cryptographic key pair, or a blockchain address. These digital identifiers can be employed in various ways to ensure the security and authenticity of the transactions involving digital assets like NFTs. In the case of a royalty payment mechanism, the digital identifier of the legacy account holder (i.e., the original creator or the entity controlling the private keys to the minting address) can be associated with the NFT. When the NFT is transferred or sold, a smart contract (or code) embedded in the token can automatically calculate and allocate a percentage of the transaction value to the legacy account holder as royalties. In some arrangements, this process could occur for the initial sale or transfer, as well as all subsequent sales or transfers that use the digital twin as the value transfer mechanism.

The authorization processor 130 can securely and transparently record these records using a consensus algorithm and stores them on a public distributed ledger. The metadata accompanying the NFT, created using the 3D digital twin file by the token generator 112, can readily be available for review. Accordingly, the systems and method enable curators of vintage objects of scarcity and value to document and monetize their curatorial practice by digitally recording the objects they have curated using the disclosure and metadata of the NFT digital twin. Moreover, these curatorial systems can be monetized by incorporating a royalty fee programmed into the NFT, which can be paid upon the transfer of the token. This arrangement encourages and rewards curators for their contributions to preserving, studying, and sharing valuable objects, fostering a thriving ecosystem for collectors, artists, and experts alike.

In some arrangements, unique physical characteristics of the object, such as wood grain patterns, are recorded via photogrammetry and utilized as authenticators to document the object's distinctive features in the associated NFT minted by the token generator 112 to a distributed ledger (e.g., blockchain storage 156). This approach, managed by the authorization processor 130, ensures a high level of security and trust in the authenticity of the digital twin, bridging the gap between the physical and digital environment while preserving the object's inherent value and history.

In some arrangements, unique physical characteristics of the object, such as wood grain patterns, textile weaves, surface textures, or other distinctive features, are recorded via photogrammetry and utilized as authenticators to document the object's unique attributes in the associated NFT minted by the token generator 112 to a distributed ledger (e.g., blockchain storage 156). By capturing these intrinsic properties, the system can offer a heightened level of detail and accuracy in the representation of the physical object as a digital twin. In some arrangements, the authorization processor 130 manages the authentication process, ensuring that the captured data accurately represents the object's specific characteristics. The processor analyzes the data from the photogrammetry capture and extracts the unique features, creating a digital signature or fingerprint that is intrinsically linked to the object. This digital fingerprint becomes an integral part of the metadata associated with the NFT, serving as a reliable and robust authenticator for the digital twin (e.g., 3D object file).

The authorization processor 130 may also use machine learning algorithms to analyze the unique features and generate an even more precise and reliable digital representation. These algorithms can be trained to recognize specific patterns or characteristics within the data, further enhancing the authentication process and increasing the level of security and trust in the digital twin's authenticity. Once the digital fingerprint is created and linked to the NFT, it can be verified against the original object at any time in the future, providing an indisputable connection between the physical object and its digital representation. This approach, managed by the authorization processor 130, ensures a high level of security and trust in the authenticity of the digital twin, bridging the gap between the physical and digital realms while preserving the object's inherent value and history.

Moreover, the incorporation of unique physical characteristics into the NFT's metadata can act as a deterrent to potential forgeries or fraud in the art and collectibles market. The ability to verify the authenticity of a digital twin against its physical counterpart with such a high degree of accuracy will make it increasingly difficult for nefarious actors to deceive collectors and investors. In addition to ensuring authenticity, the use of unique physical characteristics as authenticators within the NFT framework promotes transparency and accountability within the ecosystem. Stakeholders, including artists, collectors, and investors, can have confidence in the digital twins they interact with, knowing that the associated NFTs are securely linked to their physical counterparts. This increased level of trust fosters an improved and robust environment for the exchange, appreciation, and preservation of valuable objects and their digital representations.

The data repository 150 can store data associated with the system 100. The data repository 150 may include one or more hardware memory devices to store binary data, digital data, or the like. The data repository 150 may include one or more electrical components, electronic components, programmable electronic components, reprogrammable electronic components, integrated circuits, semiconductor devices, flip flops, arithmetic units, or the like. The data repository 150 may include at least one of a non-volatile memory device, a solid-state memory device, a flash memory device, and a NAND memory device. The data repository 150 may include one or more addressable memory regions disposed on one or more physical memory arrays. A physical memory array can include a NAND gate array disposed on, for example, at least one of a particular semiconductor device, integrated circuit device, and printed circuit board device. The data repository 150 may include an object storage 152, a token storage 154, and a blockchain storage 156.

In some arrangements, the data repository 150 includes a plurality of databases that are generated and populated by objects that have undergone the process or method described herein. The databases may give rise to an insurable assets pool, offering owners of the objects the ability to acquire insurance for their valuable items. The creation of such a database can provide a reliable and secure source of information on these objects, streamlining the insurance process and providing greater confidence to both insurers and insured parties. For example, for an insurance process, a decentralized autonomous organization (DAO) may be implemented that includes the owners of the objects. In this way, insuring the objects that have been documented and recorded in the data repository 150 can be managed in a mutual style, fostering a sense of community and shared responsibility among the members. The decentralized organization can offer settlement of claims and disputes, leveraging the power of the blockchain and the consensus algorithm to ensure transparency, efficiency, and trust in the decision-making process.

In some arrangements, the recorded information about the object can be stored in the metadata of the 3D object file and will accompany the non-fungible token (NFT) created using the 3D digital file. To facilitate the process of capturing the object and creating the digital twin, the interface controller 120 can execute several API calls, including those for photo-stitching software to create the digital 3D object file through photogrammetry. Additionally, the interface controller 120 can execute API calls to a distributed ledger or blockchain to record the capture data and mint the NFT.

To further enhance the transparency and reliability of the object's history, additional pertinent information is recorded on the blockchain storage 156 and/or stored in object storage 152, which is then referenced within the NFT's metadata. This set of data may include, but is not limited to: party performing the object capture, date and time of capture, date and location of manufacture, manufacturer and designer, materials, condition reports, provenance and previous ownership, previous repairs or alterations, historical relevance, appraisal, and sale history. By including this wealth of information within the NFT's metadata and linking it to a distributed ledger, the disclosure provides a robust, transparent, and secure method for preserving, managing, and transacting physical objects and their digital twins. This comprehensive approach ensures that all relevant data is readily accessible, verifiable, and tamper-proof, fostering trust and confidence among collectors, investors, and other stakeholders in the art and collectibles ecosystem.

The object storage 152 can store object files, also known as digital twins, which are generated through the photogrammetry process and other related content datasets, including captured images, metadata, and capture event parameters of a capture event of the physical object. The object storage 152 can accommodate object files and content datasets associated with the data processing system 102, the client system 103, the third-party device 105, or any combination thereof. The object storage 152 can be implemented to maintain a secure and organized repository of the object files, ensuring that the digital twins are readily accessible, verifiable, and tamper-proof. The content datasets stored in the object storage 152 include information about the physical objects, such as their unique physical characteristics, provenance, authentication, appraisal, condition reports, and other relevant metadata. This collection of data can be used for establishing trust and confidence in the authenticity and accuracy of the digital twins and their corresponding physical objects.

In addition to storing the object files and content datasets, the object storage 152 maintains a record of the capture event parameters associated with each physical object's capture event. These parameters may include the date and time of the capture event, the location, the equipment used, the individuals or organizations responsible for capturing the object, and other relevant details. The object storage 152 can be configured to manage and organize the stored object files, content datasets, and capture event parameters efficiently, allowing for easy retrieval and access when needed. The object storage 152 can also include object metadata including, but not limited to, the time and date of object capture, capturing agent identity, authenticating agent identity and comments, appraisal agent identity and comments, previous ownership records, relevant historical data, previous sales records, and other information deemed important to the object's description, on a distributed ledger or blockchain (e.g., blockchain storage 156).

The token storage 154 can store one or more NFTs, fungible tokens, and semi-fungible tokens, along with their corresponding addresses that indicate links with the respective tokens. The token storage 154 can accommodate NFTs, fungible tokens, and semi-fungible tokens associated with the data processing system 102 or any component thereof, the client system 103 or any component thereof, the third-party device 105 or any component thereof. These tokens can represent various aspects of the physical object or its digital twin, including the object's unique physical characteristics, provenance, authentication, appraisal, and other relevant metadata. The token storage 154 also maintains a record of the digital fingerprints or unique authenticators derived from the object's distinctive features, as managed by the authorization processor 130. These authenticators are securely linked to the corresponding NFTs, ensuring that the digital twins maintain a robust connection to their physical counterparts. By storing these authenticators alongside the tokens, the token storage 154 provides an additional layer of security and trust in the authenticity and provenance of the digital twins.

Furthermore, the token storage 154 can store information about the various parties involved in the authentication, appraisal, and curation processes. This information, captured through verifiable credentials linked to digital identifiers, is securely linked to the respective NFTs, providing a comprehensive and transparent record of the object's history and the experts involved in its evaluation. In some arrangements, the token storage 154 also maintains records of any transactions or transfers involving the NFTs, fungible tokens, and semi-fungible tokens. This transactional history offers insights into the object's market value, ownership changes, and other relevant financial aspects, contributing to a more transparent and trusted ecosystem for collectors, artists, and investors alike. By storing and managing various types of tokens and their associated data, the token storage 154 can preserve, manage, and transact digital twins.

The blockchain storage 156 can include distributed ledger technologies (DLTs) and ledgers configured to store non-fungible tokens (NFTs) and smart contracts associated with particular object files, or digital twins. The blockchain storage 156 provides a secure, transparent, and decentralized repository for NFTs, smart contracts, and the metadata associated with the digital twins and their corresponding physical objects. This storage is designed to maintain the integrity and immutability of the stored data, ensuring trust and confidence in the authenticity and accuracy of the digital twins and their associated information. The blockchain storage 156 can be configured to accommodate various types of distributed ledger technologies, including but not limited to blockchains, directed acyclic graphs (DAGs), and other decentralized data structures.

The NFTs stored in the blockchain storage 156 represent unique digital representations of the physical objects and their associated digital twins. These tokens are linked to the object files and the corresponding metadata, providing a secure connection between the digital and physical realms. The NFTs can serve as digital certificates of authenticity, ownership, and provenance, allowing for seamless and secure transactions and transfers of ownership within the ecosystem. Smart contracts stored in the blockchain storage 156 govern the rules and conditions associated with the NFTs and their corresponding digital twins. These programmable scripts can automate various processes and actions, such as royalty payments, access control, and verification of digital identifiers and credentials. The blockchain storage 156 can be organized and structured to enable efficient retrieval and access to the stored NFTs and smart contracts.

The blockchain storage 156 can store one or more smart contracts and corresponding addresses for particular smart contracts that indicate links with the corresponding smart contracts. The control structure storage 158 can store one or more control structures and their contained object files, metadata, and corresponding addresses for particular control structures that indicate links with the corresponding control structures. The blockchain storage 159 can store one or more blockchains linked to one or more smart contracts, tokens, control structures, or metadata objects, by corresponding addresses for particular smart contracts, tokens, control structures, or metadata objects that indicate links with a particular blockchain.

The interface controller 120 can link the client system 103 and third-party devices 105 with one or more of the network 101 and the data processing system 102 by one or more communication interfaces. A communication interface can include, for example, an application programming interface ("API") compatible with a particular component of the data processing system 102 or the data processing system 102. The communication interface can provide a particular communication protocol compatible with a particular component of the data processing system 102 and a particular component of the client system 103. The interface controller 120 can be compatible with particular object files and metadata (e.g., including content datasets and capture event parameters), and can be compatible with particular object file delivery systems corresponding to particular object file sand metadata objects. For example, the interface controller 120 can be compatible with transmission of image metadata, audio metadata, video metadata, or any combination thereof. For example, the interface controller 120 can be compatible with payment processing transmissions by a protocol compatible with payment processing latency and encryption structures. The communication interface of the client system 103 can be compatible with the communication interface of the data processing system 102 to perform unidirectional or bidirectional communication between the interface controllers 120.

The metadata processor 160 of the client system 103 can execute one or more actions in response to an authorization indication generated by the authorization processor 130. The metadata processor 160 can, for example, receive output from particular object files or NFTs within a particular control structure, in response to receiving transmission by the interface controller 122 based on a control structure or reference to a control structure.

The one or more third-party devices 105 may be used by a third party with a relationship to the client system 103 or data processing system 102 (e.g., vendor, customer, entity, supplier, and so on) to perform various actions and/or access various types of data, some of which may be provided over network 101. The term "third party" as used herein may refer to an individual operating one or more third-party devices 105, interacting with resources or data via the third-party devices 105. The third-party devices 105 may be used to electronically transmit data (e.g., exchange requests, attributes) to the data processing system 102, to access websites (e.g., using a browser), the internet (e.g., using a mobile application, such as a decentralized application (dApp)), supply services, supply products, and to receive and/or transmit any other types of data (e.g., geographic location data of digital or physical assets, environment data of digital or physical assets).

In some arrangements, third-party devices 105 can be configured to collect and provide environmental data to the data processing system 102. In various arrangements, the third-party devices 105 may also be used to electronically transmit data to the client system 103, and can be configured to receive and/or transmit any other types of data. For example, a third party may be a supplier of a software application installed on a physical asset. In another example, a third party may be a supply chain or logistics company that transfers physical and digital assets. The third-party device 105 (sometimes referred to herein as a "computing system") may be a mobile computing device, desktop computer, smartphone, tablet, smart watch, smart sensor, or any other device configured to facilitate receiving, displaying, and interacting with content (e.g., web pages, mobile applications, such as decentralized application (dApp), etc.). Third-party device 105 may also include an input/output circuit for communicating data over network 101 to data processing system 102 and client system 103. In some arrangements, each third-party device 105 can have a digital wallet address or exchanging (e.g., receiving or sending) fungible or non-fungible values (e.g., cryptocurrency, digital currency, stocks, bonds, loan, deed, etc.).

In certain arrangements, the third-party devices 105 can be utilized by various parties who can attest to specific details associated with the photogrammetry capture event, such as experts in the object's field, appraisal agents, or insurance agents. These parties may provide their digital identifiers (e.g., DID), which are used to confirm their involvement, expertise, and credibility. Examples of such events include verification of the object's authenticity, assessment of historical significance, confirmation of provenance, evaluation of the object's condition, and documentation of the object's ownership history. The digital identifiers can ensure a high level of trust and confidence in the information provided by these parties, as they can securely attest to their inspection or review of the object and the related details. By utilizing the third-party devices 105, these various parties can efficiently collaborate and contribute to the capture event, seamlessly integrating their input into the overall process. The third-party device 105 can be configured to receive and transmit the digital identifiers and other relevant data to the data processing system 102, client system 103, and token generator. This facilitates the secure and transparent recording of the parties' attestations and involvement in the photogrammetry capture event, as well as the subsequent minting of the associated NFT on a distributed ledger.

To securely generate and provide a digital identifier to the data processing system 102, the third-party device 105 could implement various cryptographic techniques and protocols. For instance, the third-party device 105 may use public key infrastructure (PKI) to generate a public-private key pair for the involved parties. The private key would be securely stored on the device and remain confidential, while the public key would be shared with the data processing system 102 and other relevant entities. During the photogrammetry capture event, the third-party device 105 could use the private key to sign a digital attestation or document, which may include the party's involvement, expertise, and any relevant information associated with the object. This digital signature serves as a proof of authenticity, ensuring that the digital identifier and the associated information have not been tampered with and can be trusted.

The data processing system 102, upon receiving the digitally signed attestation, can verify the signature using the party's public key, thereby confirming the integrity of the provided digital identifier and the associated data. This verification process ensures that the information received from the third-party device 105 has been securely transmitted and originates from a trusted source, maintaining the overall integrity of the system. By leveraging cryptographic techniques and secure communication protocols, the third-party device 105 can effectively generate and provide digital identifiers to the data processing system 102, maintaining the integrity of the information and fostering a secure and trustworthy environment for all stakeholders involved in the capture and preservation of valuable objects and their digital twins.

Figure 2:
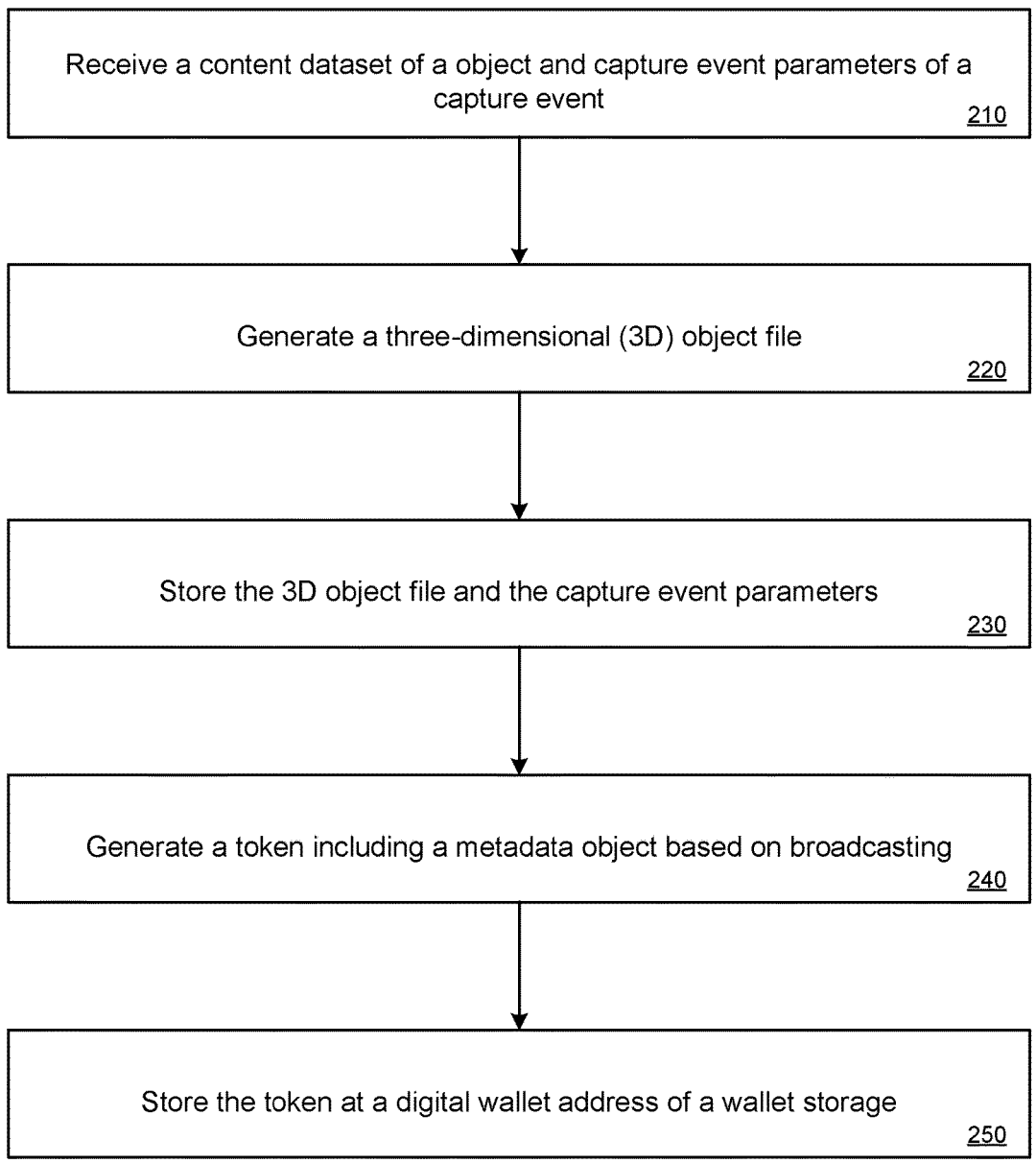
FIG. 2 illustrates a method to model objects, according to some arrangements.

Referring now to FIG. 2, a flowchart for a method 200 to model objects, in accordance with present implementations. At least the example system 100 can perform method 200 according to present implementations.

In broad overview of method 200, at block 210, the one or more processing circuits (e.g., data processing system 102) can receive a content dataset of an object and capture event parameters of a capture event. At block 220, the one or more processing circuits can generate a three-dimensional (3D) object file. At block 230, the one or more processing circuits can generate a token including a metadata object based on broadcasting. At block 240, the one or more processing circuits can generate a toke including a metadata object based on broadcasting. At block 250, the one or more processing circuits can store the token at a digital wallet address of a wallet storage. Additional, fewer, or different operations may be performed depending on the particular arrangement. In some embodiments, some, or all operations of method 200 may be performed by one or more processors executing on one or more computing devices, systems, or servers. In various embodiments, each operation may be re-ordered, added, removed, or repeated.

Referring to method 200 generally, which provides improvements to auditing, inventorying, verifying insurable interests, preserving objects for posterity, and enhancing accessibility to valuable and rare objects. By maintaining a secure and trustworthy record of physical objects, stakeholders can rely on the information provided, knowing that it is accurate, up-to-date, and resistant to tampering. An advantage of method 200 includes the integration of virtual environments and augmented reality with scarce and valuable physical objects. Many of these objects may have been previously inaccessible to a broader audience, such as artifacts stored in secure locations and not on display in museums or galleries. Through the creation of digital twins in the form of NFTs, users can interact with these objects in improved ways, opening up new possibilities for exploration, education, and appreciation of cultural heritage and history. Furthermore, method 200 enables users to experience rare and valuable objects from remote locations, fostering global collaboration and knowledge sharing. By creating a digital twin of a physical object, the technology allows people worldwide to access, study, and analyze these items in a virtual environment. This increased accessibility can lead to discoveries, insights, and research opportunities, fostering a deeper understanding and appreciation of our shared cultural heritage.

In some arrangements, the current owner of a physical object or the minting party is given the opportunity to specify a royalty to be paid upon the transfer of the NFT, which represents the digital twin of the physical object. This feature allows the creator or owner to benefit from future exchanges involving the object, ensuring that they receive ongoing compensation for their work or investment. The royalty mechanism encourages the continued support and development of the digital twin ecosystem, promoting a sustainable and equitable environment for artists, collectors, and other stakeholders involved in the creation, preservation, and exchange of valuable physical objects and their digital counterparts. Moreover, method 200 facilitates the creation of a more transparent provenance and authentication process for physical objects. By leveraging the power of a blockchain, the disclosed method can track the entire lifecycle of a physical object, from its creation to its current ownership. This level of transparency helps reduce the occurrence of fraud and forgery in the art and collectibles world, increasing trust and confidence in the market for both buyers and sellers.

At block 210, the one or more processing circuits can receive, from an application of a user device, a content dataset of a physical object and capture event parameters of a capture event of the physical object, wherein the content dataset includes overlapping content of the physical object captured and associated one or more characteristics and history of the physical object. In some arrangements, the content dataset can be obtained through a photogrammetry process, which involves capturing multiple overlapping images, videos, or audio of the physical object from various angles and perspectives. This dataset includes detailed information about the object's unique characteristics, such as textures, colors, patterns, and dimensions, as well as associated history, provenance, and any other relevant attributes.

In some arrangements, the capture event parameters provide context for the digital representation of the physical object, including information such as the date and time of the capture event, the location where the capture took place, the parties involved in the capture event (e.g., experts, authentication agents, or device operators), the environmental conditions during the capture (e.g., lighting, temperature, humidity), and the equipment and settings used for capturing the content dataset (e.g., camera model, lens, resolution, exposure settings). Additionally, the capture event parameters may include any preprocessing steps or calibration data used to ensure the accuracy and reliability of the captured content dataset. The preprocessing steps can involve correcting lens distortion, image alignment, color balancing, and other necessary adjustments. The calibration data may include information about the spatial relationships between cameras, reference objects, or markers used during the capture event to improve the precision of the digital representation.

At block 210, the one or more processing circuits can receive, from an application of a user device, a content dataset of an object and capture event parameters of a capture event of the object, wherein the content dataset comprises overlapping content of the object captured and associated metadata of the object. In some arrangements, the content dataset can be obtained through a photogrammetry process, which involves capturing multiple overlapping images, videos, or audio of the object from various angles and perspectives. This dataset includes detailed information about the object's unique characteristics, such as textures, colors, patterns, and dimensions, as well as associated metadata, including history, provenance, and any other relevant attributes.

In some arrangements, the capture event parameters provide context for the digital representation of the object, including information such as the date and time of the capture event, the location where the capture took place, the parties involved in the capture event (e.g., experts, authentication agents, or device operators), the environmental conditions during the capture (e.g., lighting, temperature, humidity), and the equipment and settings used for capturing the content dataset (e.g., camera model, lens, resolution, exposure settings). Additionally, the capture event parameters may include any preprocessing steps or calibration data used to ensure the accuracy and reliability of the captured content dataset. The preprocessing steps can involve correcting lens distortion, image alignment, color balancing, and other necessary adjustments. The calibration data may include information about the spatial relationships between cameras, reference objects, or markers used during the capture event to improve the precision of the digital representation.

At block 220, the one or more processing circuits generate a three-dimensional (3D) object file based on the content dataset, wherein the 3D object file serves as a digital twin of the object, corresponding with one or more characteristics of the object. The creation of the 3D object file involves processing and reconstructing the captured content dataset using algorithms and techniques to stitch together the overlapping images, videos, or audio and extract depth information to form a precise and accurate digital representation that closely corresponds with the object's unique characteristics, such as shape, size, texture, and color. The 3D object file can be linked, such that upon selection by an application of the user device, can be configured to present an image or video of the physical object and the link can be the destination or pointer to the storage location of the metadata object (e.g., stored in token storage 154). In some arrangements, the one or more processing circuits can generate one or more 3D object files in accordance with the content dataset and capture event parameters. The one or more processing circuits can receive, collect, or obtain metadata of the physical object including, but not limited to, video, scannable code, audio, text, any media or digital representation, public and private key pair, executable programs, or any combination thereof of the physical object.

To create the 3D object file, which serves as a digital twin of the object, the processing circuits can utilize algorithms and techniques to process and reconstruct the captured content dataset. This process involves stitching together the overlapping images, videos, or audio and extracting depth information to form a precise and accurate digital representation that closely corresponds with the physical object's unique characteristics, such as shape, size, texture, and color. During block 220, the processing circuits may also perform optimization, compression, or other post-processing techniques on the 3D object file to improve its visual quality, reduce file size, or enhance its compatibility with various platforms and applications. These optimizations ensure that the digital twin maintains its accuracy and fidelity while being efficiently stored, transmitted, and displayed across different systems and devices. By generating a 3D object file, block 220 creates a digital twin that accurately represents the physical object and its associated information, laying the groundwork for subsequent tokenization and blockchain integration.

As used herein, a "smart contract control structure," "metadata control structure," and "control structure" may be a computer program (also known as a program, software, software application, script, or code) configured to combine one or more attributes of the physical or digital asset together to create a single control structure for each metadata object. In some arrangements, the one or more processing circuits can implement and execute a control structure to output, append, or update metadata objects of one or more tokens to include one or more metadata, attributes, and conditions (e.g., smart contracts), fields, a value, and so on.

The control structure can be written in any form of programming language, including compiled or interpreted languages, and/or declarative or procedural languages, and it can be deployed in any form, including as a stand-alone program or as a circuit, component, subroutine, object, or other unit suitable for use in a computing environment. A metadata object may, but need not, correspond to a file in a file system. A metadata object can be stored in a portion of a file that holds other programs or data (e.g., one or more scripts stored in a markup language document), in a single file dedicated to a token in question, or in multiple coordinated files (e.g., files that store one or more subsystems, sub-programs, or portions of code). A control structure can be deployed to be executed on one computer or on multiple computers that are located at one site or distributed across multiple sites and interconnected by a communication network. The processes and logic flows described in this specification can be performed by one or more programmable processors executing one or more control structures (or computer programs) to perform actions by operating on input data.

As used herein, the phrase "smart contract" generally refers to a self-executing code (e.g., in a ledger network or other system) that executes when a set of conditions that have been agreed upon by the parties of the smart contract are met. Although the FIGS. and specification generally discuss utilizing smart contracts on 3D object files or metadata objects associated with physical objects, the systems, methods, and apparatuses disclosed herein can also be used for a plurality of types of non-fungible or fungible assets, such as but not limited to commodities, common shares, options, dollar bills, fiat currency, digital currency, deeds, leases, wills, other exchanges, non-smart contracts, traditional legal contracts, financial disbursements, taxes, and other types of non-fungible or fungible assets parties use and exchange. Parties to the smart contract for NFTs or other types of non-fungible or fungible assets may be individuals, agents, companies, organizations, entities, providers, and so on.

In another arrangement, the one or more processing circuits can convert an artificially generated object from an intellectual understanding by a human or animal to generate a 3D object file. This conversion can involve interpreting and processing descriptions, concepts, or ideas provided by the human or animal (at block 210) and using algorithms and techniques to create a digital representation of the object based on the provided information. The generated 3D object file can serve as a digital twin of the artificially created object, reflecting the unique characteristics, such as shape, size, texture, and color, that were envisioned by the human or animal. In this arrangement, the one or more processing circuits can generate the 3D object file by utilizing natural language processing, machine learning, and computer vision techniques to interpret and process the input from the human or animal. These techniques can help translate the intellectual understanding into a digital representation that closely corresponds with the envisioned object's unique characteristics. The processing circuits may also perform optimization, compression, or other post-processing techniques on the 3D object file to improve its visual quality, reduce file size, or enhance its compatibility with various platforms and applications. These optimizations ensure that the digital twin maintains its accuracy and fidelity while being efficiently stored, transmitted, and displayed across different systems and devices. By generating a 3D object file based on the intellectual understanding provided by a human or animal, this arrangement creates a digital twin that accurately represents the envisioned object and its associated information, laying the groundwork for subsequent tokenization and blockchain integration.

For example, an artist may conceptualize a unique sculpture in their mind, but has not yet physically created it. In order to convert this intellectual thought into a 3D object file, the artist could first describe the envisioned sculpture in detail, providing information about its shape, size, texture, color, and other relevant characteristics. The one or more processing circuits would then receive this description, possibly in the form of text, voice input, or even a rough sketch. Utilizing natural language processing, machine learning, and computer vision techniques, the processing circuits would interpret and process the artist's input, extracting key information about the envisioned sculpture. These techniques would help the processing circuits create a digital representation of the sculpture based on the provided information. The generated 3D object file would serve as a digital twin of the artist's envisioned sculpture, reflecting the unique characteristics described by the artist. By converting the intellectual thought into a 3D object file, the artist could then use this digital representation for various purposes, such as tokenization, virtual exhibitions, or as a reference for creating the physical sculpture.

In this example, the one or more processing circuits can generate the 3D object file by utilizing natural language processing, machine learning, and computer vision techniques to interpret and process the input from the human or animal. These techniques can be applied in various ways to facilitate the conversion of intellectual thoughts or descriptions into a 3D object file. Natural Language Processing (NLP) techniques can be employed to analyze and understand the textual or verbal descriptions provided by the human or animal. For instance, an artist might describe the envisioned sculpture using specific terms related to its shape, size, color, or texture. The processing circuits would then use NLP algorithms to extract key information from these descriptions, such as identifying relevant objects, attributes, and relationships among them. This parsed information can serve as the foundation for generating a 3D object file. Machine Learning (ML) techniques can be utilized to create predictive models and identify patterns within the provided data. For example, based on the extracted information from the NLP analysis, the processing circuits could apply ML algorithms to generate a parametric model that represents the artist's vision. This model could be refined iteratively, taking into account feedback from the artist or other input sources to improve the accuracy of the generated 3D object. Computer Vision techniques can be implemented to further refine the 3D object file by analyzing and processing any visual input from the human or animal, such as sketches or reference images. The processing circuits can employ image recognition and feature extraction methods to identify key elements in the visual input and incorporate them into the 3D object file. This can help ensure that the generated digital representation closely matches the artist's envisioned design.

In an alternative (or combinational) example, the artist could be connected to a neural or brain-computer interface (BCI) system (e.g., part of the interface controller 120) capable of directly interpreting their thoughts. While the artist envisions the unique sculpture in their mind, the BCI system would capture the brain signals associated with their creative thought process. These captured signals would then be analyzed and decoded by the one or more processing circuits, which utilize advanced machine learning algorithms and neural decoding techniques to interpret the artist's thought patterns and extract the key features of the envisioned sculpture, such as its shape, size, texture, and color. Once the relevant information has been extracted from the artist's brain signals, the processing circuits would generate a 3D object file representing the artist's intellectual thought as a digital twin of the envisioned sculpture. This digital representation would reflect the unique characteristics that the artist had in mind, allowing them to further refine and manipulate the digital sculpture, tokenize it, or use it as a reference for creating the physical piece. By connecting the artist to a BCI system, the process of converting an intellectual thought into a 3D object file becomes even more direct, enabling a seamless transition from the artist's mind to a tangible digital representation.

In another example with reference to levels of assets, an autographed baseball becomes the top-level digital asset with several supporting files, forming a complete package of information that provides context, authenticity, and provenance. The 3D object file representing the autographed baseball is generated and associated with a unique non-fungible token (NFT) (generated at block 240). This NFT serves as a gateway to access all the related information, including the 3D object file and other supporting files, such as a photograph of Babe Ruth signing the baseball, a video of the signing event, and any other relevant documentation. To enrich the digital representation of the autographed baseball, capture event parameters are also recorded during the digitization process. These parameters can include time stamps, location data, and signatures of parties involved in the digitization, such as the archeologist who discovered the bone or an expert authenticating the signature on the baseball. In addition to the main 3D object file, other multimedia files can be included to provide further context and support the authenticity of the digital asset. For example, photographs of the doctor holding the autographed baseball or documents verifying the baseball's origin could be added to the collection of associated files. These supplementary materials contribute to the overall value of the digital asset, making it more desirable and meaningful to collectors, investors, and enthusiasts.

In the context of the autographed baseball example, the one or more processing circuits can generate a three-dimensional (3D) object file based on the content dataset, wherein the 3D object file serves as a digital twin of the baseball, corresponding with one or more characteristics of the baseball, such as its shape, size, texture, and color. In this scenario, there could be multiple levels of digital assets involved, including the main baseball asset, the autograph on the baseball, and any other associated assets, such as a certificate of authenticity or a photograph of Babe Ruth signing the baseball. To create the 3D object files for each of these assets, the one or more processing circuits would process and reconstruct the captured content dataset using algorithms and techniques to stitch together overlapping images, videos, or audio and extract depth information. This results in precise and accurate digital representations of the assets that closely correspond with their unique characteristics. The 3D object files for each asset can be linked together, with each link serving as a destination or pointer to the storage location of the corresponding metadata object (e.g., stored in token storage 154). This allows for the presentation of an image or video of the physical objects upon selection by an application of the user device.

In another example with reference to levels of assets, a historical site such as Machu Picchu becomes the top-level digital asset with several supporting files, forming a complete package of information that provides context, historical background, and cultural significance. The 3D object file representing Machu Picchu is generated and associated with a unique non-fungible token (NFT) (generated at block 240). This NFT serves as a gateway to access all the related information, including the 3D object file and other supporting files, such as photographs of the site, videos of archaeological excavations, and any other relevant documentation. To enrich the digital representation of Machu Picchu, capture event parameters are also recorded during the digitization process. These parameters can include time stamps, location data, and signatures of parties involved in the digitization, such as archaeologists, historians, or preservation experts.

In the context of the Machu Picchu example, the one or more processing circuits can generate a three-dimensional (3D) object file based on the content dataset, wherein the 3D object file serves as a digital twin of the site, corresponding with one or more characteristics of the site, such as its architecture, terrain, and surrounding landscape. In this scenario, there could be multiple levels of digital assets involved, including the main site asset, individual structures or features within the site, and any other associated assets, such as historical documents, artifacts, or stories related to the site. To create the 3D object files for each of these assets, the one or more processing circuits would process and reconstruct the captured content dataset using algorithms and techniques to stitch together overlapping images, videos, or audio and extract depth information. This results in precise and accurate digital representations of the assets that closely correspond with their unique characteristics. The 3D object files for each asset can be linked together, with each link serving as a destination or pointer to the storage location of the corresponding metadata object (e.g., stored in token storage 154). This allows for the presentation of an image or video of the historical site and its features upon selection by an application of the user device.

Referring to the Machu Picchu example and digitizing and tokenizing spaces, to generate the 3D object file and associated token (e.g., NFT) for a historical site like Machu Picchu, several objective calculations and numerical data may be determined to ensure accuracy and precision in the digital representation. In some arrangements, high-resolution images and videos of the site can be captured, potentially using LiDAR or photogrammetry techniques, to obtain detailed spatial and visual information. These data points can be processed to generate point clouds, which consist of a large number of three-dimensional coordinates representing the site's surface. To create an accurate 3D object file, algorithms such as Iterative Closest Point (ICP) or Simultaneous Localization and Mapping (SLAM) can be employed to align and merge these point clouds, thereby reducing noise and inconsistencies. In some arrangements, surface reconstruction algorithms like Poisson Surface Reconstruction or Marching Cubes can be used to generate a mesh from the aligned point clouds, which consists of interconnected vertices, edges, and faces that define the 3D structure of the site. Additionally, texture mapping techniques are applied to project the captured visual information, such as colors and patterns, onto the generated mesh. This process requires the calculation of texture coordinates (UV coordinates) that map each vertex of the mesh to its corresponding position in the 2D texture image. In some arrangements, to generate the token (e.g., NFT) linked to the 3D object file, unique identifiers can be generated for each asset involved in the digital representation. These identifiers can be based on cryptographic hash functions or other unique identification methods. In some arrangements, the token generation process can also involves encoding the metadata, including the asset's provenance, historical context, and associated files, into the token structure. This metadata, along with the 3D object file, is then securely stored and linked to the token, enabling the seamless retrieval and presentation of the historical site and its features in virtual environments or augmented reality applications.

In some arrangements, the one or more processing circuits can generate multiple 3D object files in accordance with the content dataset and capture event parameters. These processing circuits can receive, collect, or obtain metadata of the physical objects, including, but not limited to, video, scannable code, audio, text, any media or digital representation, public and private key pair, executable programs, or any combination thereof of the physical objects. This multilayered approach allows for a more comprehensive representation of the autographed baseball and its associated assets, enabling users to access, verify, and interact with the digital twins and their metadata on the distributed ledger or blockchain.

At block 230, the one or more processing circuits store the 3D object file and the capture event parameters in a data repository (e.g., data repository 150). This storage ensures that the digital twin and its associated information are securely and efficiently stored, allowing for easy retrieval, access, and management of the data. Data repository 150 can be a centralized or distributed storage system, designed to provide performance, reliability, and scalability for managing the 3D object files and capture event parameters. In particular, object storage 152 within data repository 150 can be utilized to store the 3D object files and capture event parameters. Each 3D object file and associated capture event parameters can be stored as a unique object within object storage 152, identified by a unique identifier.

In some arrangements, object storage 152 can provide features, such as versioning, metadata management, and data deduplication. Versioning allows for tracking changes to the 3D object files and capture event parameters over time, enabling users to access previous versions or restore data in case of accidental deletion or corruption. Metadata management enables the storage of additional information related to the 3D object files and capture event parameters, such as the date of creation, the author or owner, and any associated licensing or copyright information. Data deduplication optimizes storage usage by identifying and eliminating redundant data, thereby reducing storage costs and improving overall efficiency. Additionally, object storage 152 can perform data encryption and access control mechanisms to ensure the security and privacy of the stored 3D object files and capture event parameters. Data encryption can be applied to protect the data both at rest and during transmission, using cryptographic algorithms such as AES, RSA, or other secure encryption methods. Access control mechanisms, including role-based access control and authentication protocols, can be implemented to restrict access to the stored data, allowing only authorized users or systems to access and manage the 3D object files and capture event parameters.

At block 240, the one or more processing circuits generate a token including a metadata object based on broadcasting the 3D object file, the content dataset, and the capture event parameters to a distributed ledger, wherein the metadata object is embedded with the metadata of the object, a pointer to the capture event parameters, and a pointer to the 3D object file. The token generation process typically involves minting a non-fungible token (NFT) that uniquely represents the digital twin and serves as a digital certificate of ownership and authenticity for the object. The NFT is minted on a specific blockchain platform, such as Ethereum, Bitcoin, Finance Smart Chain, or others, and is assigned a unique identifier that distinguishes it from other tokens on the blockchain. By generating a token that encapsulates the 3D object file and its associated metadata, block 240 establishes a secure, verifiable, and transparent link between the object and its digital twin.

In some arrangements, the metadata integrated into the token contains information about the physical object, including its unique characteristics, history, provenance, and other relevant attributes. This metadata object also incorporates the capture event parameters, which provide context and credibility to the digital twin by documenting the conditions and circumstances under which the physical object was digitized. The metadata object may also include any additional data or documentation, such as expert authentication or appraisal, which further enriches the digital twin and enhances its value and utility.

The creation of the token can include minting a non-fungible token (NFT) that uniquely represents the information and data of the object and serves as a digital certificate of ownership and authenticity for the physical object. To generate the NFT, the processing circuits can use a smart contract to embed the metadata object within the token. The metadata object encompasses the metadata of the object, which includes the unique characteristics and history of the physical object, pointers to the capture event parameters, and pointers to the 3D object file. This integration provides that all relevant information about the physical object and its digital twin is securely and transparently linked within the NFT, providing a cohesive and complete record of the object's digital or physical journey.

At block 240, the one or more processing circuits can broadcast the 3D object file, content dataset, and capture event parameters to a distributed ledger. Broadcasting this information to the distributed ledger enables various parties to access, verify, and interact with the subsequently generated NFT and its associated information. In response to this broadcast, a token, including a metadata object, is generated (or returned). To facilitate the token generation, the processing circuits initiate an exchange on the selected blockchain platform. In some arrangements, the exchange can include specifying the destination address (e.g., the digital wallet address of the user or a designated smart contract) and providing the exchange details, such as the 3D object file, the content dataset, capture event parameters, and any other information. The processing circuits may also digitally sign the transaction using the user's private key or other cryptographic methods, ensuring the integrity and authenticity of the transaction. This signature verifies that the user or entity initiating the transaction is authorized to do so and prevents unauthorized parties from tampering with or altering the transaction details. Once the transaction is prepared and signed, the processing circuits broadcast it to the blockchain network. The nodes on the network then validate the transaction, ensuring that it complies with the platform's consensus rules and protocols. Upon successful validation, the transaction is added to a new block and appended to the blockchain, permanently recording the generated NFT and its associated data. By broadcasting the 3D object file, content dataset, and capture event parameters to a distributed ledger or blockchain, block 240 creates a transparent and secure record of the digital twin, allowing various parties to track its ownership, provenance, and history.

Additionally, the processing circuits may apply cryptographic algorithms and techniques, such as digital signatures or hashing, to ensure the integrity and authenticity of the metadata object and its contents. These cryptographic measures create a secure connection between the digital twin and the NFT, making it difficult for unauthorized parties to tamper with or counterfeit the digital representation. The NFT generation process may also involve minting the token on a specific blockchain platform, such as Ethereum, Bitcoin, Binance Smart Chain, or others, depending on factors like the user's preference, platform compatibility, or available features and functionalities. Once the NFT is minted, it is assigned a unique identifier that distinguishes it from other tokens on the blockchain and enables users to easily track, manage, and verify its ownership, provenance, and associated data. By generating a token that encapsulates a metadata object, block 240 establishes a secure, verifiable, and transparent link between the physical object and its digital twin.

In general, the one or more processing circuits can generate (or mint) one or more non-fungible tokens linked to metadata objects and encapsulated within a control structure. The one or more processing circuits can generate a token corresponding to a particular metadata object or metadata objects. Generating and/or minting an NFT can include into a digital asset stored on a blockchain. Thus, the NFT can digitally represent various aspects of the object and can serve as proof of ownership and provenance of a specific object (e.g., physical asset, intellectual asset). The NFT can be verified by anyone on a blockchain and the token ensures authenticity of the 3D object file. Each NFT can store a data value composed of at least a token identifier and a contract number. The token identifier can be a unique set of characters (e.g., numbers, symbols, and letters) uniquely identifying the specific NFT. For example, token identifier #1 can be identified as "G8fNM64!", and token identifier #2 can be identified as "lkj93IOs." The contract number can be a unique set of characters (e.g., numbers, symbols, and letters) uniquely identifying the control structure used by the NFT in managing and executing the functionality such as restricting the NFT, outputting from the NFT, etc. For example, control structure #1 can be identified as "CS_00001", and control structure #2 can be identified as "CS_00002." Thus, the data value can be an aggregate of the two identifiers, such as a cryptographic hash of the two identifiers (e.g., data value before hash "G8fNM64!CS_00001", after hash "DFCD 3454 BBEA 778B 712A 652G 336F 90B1 7D9A 46AF"), or encrypted (e.g., using RSA encryption, AES encryption, SHA encryption, DES encryption). In some arrangements, the data value can be the public key of the NFT used to decrypt the NFT and/or interface with the destination address on the blockchain.

In some arrangements, the one or more processing circuits can hash (e.g., SHA1, MD5, etc.), using a cryptographic hash or another math-based function, the control structure (or contract number) to create a digital signature of the control structure which can be stored in token storage 154. In some arrangements, the one or more processing circuits can hash (e.g., SHA1, MD5, etc.), using a cryptographic hash or another math-based function, the token to create a digital signature of the NFT which can be stored in blockchain storage 156. The cryptographic hash of the token can allow users and system described herein to receive tokens and verify them prior to amending and/or updating the token or blockchain.

In some arrangements, the one or more processing circuits can obtain a preexisting token and can assign the preexisting token to a particular metadata object or metadata objects. In other arrangements, the one or more processing circuits can generate a non-fungible token that is unique against all other tokens generated by the one or more processing circuits can to identify metadata objects, a fungible token that can be generated or replicated an arbitrary number of times, and a semi-fungible token that can be generated or replicated a particular number of times below or meeting a particular replication threshold. One or more fungible tokens or semi-fungible tokens can, for example, be associated with a particular metadata object or the same metadata object. The one or more processing circuits can access the token storage 154 to determine whether the replication threshold corresponding to a particular threshold is satisfied, and can block or forgo generation or replication of a token beyond or meeting the replication threshold in response to a determination that the replication threshold corresponding to a particular threshold is satisfied. For example, the token generator 112 can generate multiple NFTs based on a number of new metadata objects or NFTs indicated by an obtained preexisting token.

In some arrangements, the token may be embedded into the 3D object file. This integration would create a direct link between the digital representation of the physical object and its corresponding token, streamlining access to the token's associated information and enhancing the overall security of the asset. By incorporating the token directly into the 3D object file, it becomes an intrinsic part of the digital twin, establishing a more robust connection between the token and the object's unique characteristics, history, and provenance.

In some arrangements, the token may not be embedded into the 3D object file itself, but rather, it may be closely associated with the metadata object that accompanies the 3D object. For example, this metadata object can contain information about the capture event, such as timestamps, location, and parties involved. One or more of these parties may attest to the conditions of the subject being digitized or the capture event itself by signing the transaction recorded on the distributed ledger technology (DLT). The output of the NFT that can be restricted to a remote device (e.g., client system 103 or third-party device 105) remote from the one or more processing circuits. The restriction can be an attribute and once at least one or more attributes of the control structures are satisfied and/or detected an output can occur. Additionally, outputting may be restricted prior to verifying the authenticity of at least a portion of the physical object or 3D object file. In some arrangements, outputting can include releasing or transmitting a fungible value or asset from one digital wallet address (e.g., blockchain address) to a digital wallet address. In various arrangements, outputting can include releasing or transmitting a non-fungible value or asset from a first digital wallet address (e.g., blockchain address) to a second digital wallet address.

With reference to the baseball example in block 220, the one or more processing circuits generate a token, including a metadata object, based on broadcasting the 3D object files, the content dataset, and the capture event parameters to a distributed ledger for the autographed baseball and its associated assets. Each 3D object file, such as the baseball, the autograph, and any other associated assets like the certificate of authenticity or the photograph of Babe Ruth signing the baseball, would have a corresponding token generated. In some arrangements, the metadata object embedded within each token contains the metadata of the respective object, a pointer to the capture event parameters, and a pointer to the 3D object file. The capture event parameters might be similar or the same for each asset, as they are all related to the same overarching context of the autographed baseball.

When the processing circuits generate these tokens, they initiate an exchange on the selected blockchain platform. The exchange can include specifying the destination address (e.g., the digital wallet address of the user or a designated smart contract) and providing the exchange details, such as each token's unique identifier, the metadata object, and any other required information. The processing circuits may also digitally sign the transaction using the user's private key or other cryptographic methods, ensuring the integrity and authenticity of the transaction. Once the transaction is prepared and signed, the processing circuits broadcast it to the blockchain network. The nodes on the network validate the transaction, ensuring that it complies with the platform's consensus rules and protocols. Upon successful validation, the transaction is added to a new block and appended to the blockchain, permanently recording the NFTs and their associated data.

In another arrangement, a single token can be associated with the plurality of objects, effectively representing the entire collection of assets related to the autographed baseball. This single token would have a metadata object embedded within it, containing pointers to each of the 3D object files, such as the baseball, the autograph, the photograph of Babe Ruth signing the baseball, and any other associated assets. The metadata object would also include the metadata of all these objects and their respective capture event parameters, creating a comprehensive digital representation of the entire collection. By employing a single token to represent the collection of assets, users can more easily manage, trade, and transfer the entire collection as a unified entity on the blockchain. This approach simplifies the tracking of provenance and ownership history, ensuring that all related assets are kept together and their relationships are preserved.

At block 250, the one or more processing circuits can store the token at a digital wallet address of a wallet storage of the user device. To begin the storage process, the processing circuits can first verify the user's digital wallet address. This address can serve as a unique identifier for the user on the blockchain and is important for enabling them to receive, store, and manage their NFTs and other digital assets. The address may be provided by the user during the setup process, automatically generated by the wallet software, or retrieved from the user's device.

Upon confirming the user's digital wallet address, the processing circuits initiate the transfer of the token from the minting location, such as a smart contract or originating address, to the user's digital wallet. This involves creating a blockchain transaction, specifying the source and destination addresses, the unique identifier of the token, and any required fees or gas costs. To ensure the authenticity and integrity of the transaction, it is digitally signed using the private key of the originating address. In some arrangements, before the transaction can be completed, it is broadcast to the blockchain network, where it undergoes a series of validation and consensus processes, as detailed in block 240. Once the transaction has been confirmed, the token is successfully transferred to the user's digital wallet address and stored in the wallet storage of the user device. Block 250 ensures that the user retains full control and ownership of their NFT, providing them with a secure and accessible storage solution for provenance tracking of the object. The process of storing the token at a digital wallet address allows users to utilize the digital representation of the physical object for various applications, such as trading, showcasing, or verifying authenticity and provenance.

In some arrangements, the one or more processors can be configured to (1) generate a smart contract programmed to automatically calculate and distribute a payment upon an exchange of the token, (2) in response to receiving a transfer request on the distributed ledger, calculate a payment amount associated with a royalty of a curator according to the metadata object of the token, and (3) distribute the payment according to the payment amount to a curator wallet address associated with the curator. In particular, the one or more processing circuits can be configured to generate a smart contract that is programmed to automatically calculate and distribute a payment upon an exchange of the token. In response to receiving a transfer request on the distributed ledger, the one or more processing circuits can calculate a payment amount associated with a royalty of a curator according to the metadata object of the token. This enables curators to receive compensation for their efforts in maintaining, preserving, and enhancing the value of the objects they oversee.

In some arrangements, the smart contract serves as a self-executing contract with the terms of the agreement directly written into code. By automating the calculation and distribution of payments, the smart contract ensures that transactions are executed efficiently and securely, minimizing the potential for human error and reducing the need for intermediaries. In some arrangements, the royalty information can be stored in the metadata object of the token. This royalty mechanism promotes a sustainable and equitable environment, encouraging continued investment in the preservation, authentication, and promotion of valuable physical objects and their digital counterparts. Moreover, the one or more processing circuits can automatically distribute the calculated payment to a curator wallet address associated with the curator. This seamless transfer of funds ensures that curators receive their royalty payments promptly and securely, reducing the risk of lost or misdirected funds.

In some arrangements, one or more processing circuits can extract various characteristics (or metadata) of the physical object by analyzing the content dataset and capture event parameters. These characteristics (or metadata) may include historical data, provenance data, appraisal data, and authentication data, which are all vital pieces of information that contribute to the object's overall value, authenticity, and significance. Historical data may encompass the object's background, its origins, any previous owners, and its journey through time. Provenance data refers to the object's chain of custody, providing a clear and verifiable record of previous ownership and transactions. Appraisal data consists of expert assessments of the object's value, which may be based on factors such as rarity, condition, demand, and historical significance. Authentication data includes any evidence or expert opinions that confirm the object's authenticity, such as certificates, expert analyses, or scientific testing results. In some arrangements, the one or more processing circuits can store extracted characteristics in the metadata object of the token as a digital signature. This digital signature serves as a unique and verifiable link between the characteristics and the token, ensuring that the object's provenance, historical data, appraisal data, and authentication data are securely and permanently associated with its digital twin.

The one or more processing circuits can determine additional processing is required for the 3D object file based on specific 3D object file parameters. These parameters can include resolution, level of detail, file format compatibility, texture mapping, or surface normal adjustments. By considering these factors, the processing circuits can optimize the 3D object file to meet various needs, such as storage requirements, visualization quality, and compatibility with different systems and platforms. Resolution refers to the number of pixels or points used to represent the 3D object file, which directly impacts the object's visual quality and file size. The processing circuits may adjust the resolution to balance the level of detail with storage and performance constraints. Level of detail pertains to the complexity of the 3D object file's geometry and the amount of information it contains. The processing circuits can optimize the level of detail depending on the intended use of the digital twin, ensuring that it retains sufficient detail for its purpose without causing undue strain on rendering or storage resources. File format compatibility is important for ensuring that the 3D object file can be accessed and utilized across various platforms and applications. The processing circuits can convert the 3D object file into different formats or generate multiple versions to accommodate diverse software and hardware environments.

Texture mapping involves applying 2D images or patterns onto the surface of the 3D object file, adding realism and depth to its appearance. The processing circuits can optimize texture mapping to improve the visual quality of the digital twin, ensuring that the textures align correctly with the object's geometry and do not introduce visual artifacts or distortions. Surface normal adjustments refer to the process of refining the surface normals of the 3D object file, which determine how light interacts with the object's surface. By adjusting surface normals, the processing circuits can enhance the object's appearance, making it more visually accurate and appealing when rendered in virtual or augmented reality environments. After determining the additional processing required, the one or more processing circuits can re-generate the 3D object file by applying the necessary adjustments. This optimized 3D object file ensures that the digital twin is suitable for various applications, such as virtual exhibitions, augmented reality experiences, or digital archiving.

In some arrangements, the one or more processing circuits can generate and provide a plurality of digital identifiers (e.g., decentralized identifier (DID)) to one or more third-party computing systems, where these third-party systems are associated with various aspects of the digital twin creation process, such as the capture event, the 3D object file, or the token (NFT). These digital identifiers can be uniquely assigned to and cryptographically secured for each third-party of a plurality of third-parties, ensuring that each identifier is exclusive to a specific third-party and protected from unauthorized access or tampering. Furthermore, each of the plurality of digital identifiers can be configured to enable each third-party of the plurality of third-parties to digitally sign one or more portions of the metadata of the 3D object file. In order to validate the one or more portions of the metadata, the one or more processing circuits can verify the digital signatures associated with the digital identifiers. This is done in response to receiving a combination of the digital identifier of the plurality of digital identifiers and a digital signature of the one or more portions of the metadata. By checking the digital signatures against the corresponding digital identifiers, the processing circuits can ensure the authenticity and integrity of the metadata, providing a reliable and secure foundation for the digital twin and its associated NFT.

In some arrangements, the one or more processing circuits can determine an authentication agent for the physical object based on the capture event and a plurality of environmental information. This environmental information may include factors such as the physical object's origin, category, value, and rarity. By considering these various factors, the processing circuits can identify an authentication agent best suited to verify and authenticate the physical object in question. Once the authentication agent has been determined, the processing circuits can collect authentication agent information associated with the agent. This information may include the agent's identity, qualifications, areas of expertise, the date and time of authentication, and any relevant notes made by the agent during the authentication process. After gathering the authentication agent information, the one or more processing circuits can update the metadata of the digital twin to further include this authentication agent information.

In some arrangements, the content dataset includes a diverse array of media, including one or more captured images, videos, or audio recordings of the physical asset. This collection of media ensures a digital representation of the physical object, enabling users to better understand, appreciate, and interact with the object's digital twin. The capture event parameters can include various elements, such as the date, time, and location of the event, as well as the parties present or involved during the capture process. These parameters may also include environmental conditions, such as lighting, temperature, and humidity, which could potentially affect the quality and accuracy of the captured media. When generating the token, the one or more processing circuits can mint a non-fungible token (NFT) using the metadata of the 3D object file. The minting process creates a unique and indivisible digital asset that is securely linked to the physical object through its metadata. This metadata, which contains information about the object, such as its characteristics, provenance, and authentication, ensures that the NFT is an accurate and trustworthy digital representation of the physical asset.

In some arrangements, the one or more processing circuits can present the 3D object file via an application on the user's device, featuring adjustable content that allows for user interaction. Upon selecting a portion of the adjustable content, the application is configured to modify one or more features of the 3D object file, giving users the flexibility to explore and engage with the digital twin in a more personalized and immersive manner. These adjustable features can include, but are not limited to, zooming, rotating, changing lighting conditions, or modifying textures, which can facilitate a deeper understanding of the physical object's details and intricacies.

In the process of broadcasting the 3D object file, content dataset, and capture event parameters to the distributed ledger, the one or more processing circuits perform several steps to ensure security, authenticity, and network compliance. First, the 3D object file, content dataset, and capture event parameters are encoded to facilitate secure transmission. Next, the encoded 3D object file, content dataset, and capture event parameters are signed with a private key corresponding to the digital wallet address of the user's device wallet storage, establishing a verifiable link between the data and its originating wallet. The signed data is then transmitted to a network of nodes participating in the distributed ledger.

These nodes can independently validate the 3D object file, content dataset, capture event parameters, and the associated signature, confirming the data's authenticity, integrity, and compliance with the consensus rules governing the network of nodes. This distributed validation process ensures that the 3D object file, content dataset, and capture event parameters are accurate, trustworthy, and resistant to tampering or forgery. Once the nodes have validated the data, a token is generated (or returned) including a metadata object, and this token is incorporated into a new block of exchanges. This new block is subsequently appended to an existing chain of blocks in the distributed ledger, further reinforcing the token's immutability and creating a permanent record of the token's existence, ownership, and history.

In some arrangements, a "manual capture" process is employed to create digital twins of physical objects with greater accuracy and reliability. In this approach, the physical object is brought to a dedicated studio equipped with a controlled environment specifically designed for photogrammetry. This environment ensures optimal lighting and conditions for the precise digital capture of the physical object's details, textures, and colors. In these arrangements, one or more authenticating agents have the opportunity to physically inspect the object during the capture process. These agents possess expert knowledge in the object's domain and can offer valuable insight and validation of the object's authenticity, provenance, and other essential attributes. The involvement of expert authenticating agents in the manual capture process can bolster the trust and reliability of the digital representation.

The authenticating agent's inspection remarks, along with other relevant details related to the photogrammetry process and the object itself, are recorded on a public distributed ledger or blockchain using a consensus algorithm. This information can encompass a set of data, including the date and time of capture, the agent performing the capture, the authenticating agent's inspection and remarks, and undisputed object attributes such as current ownership, manufacturer, designer, date of manufacture, condition at the time of capture, provenance, historical relevance, curator, sales history, appraisals, and materials. This wealth of data can be securely stored in the metadata of the 3D object file and accompanies the non-fungible token (NFT) created using the 3D digital file. This provides additional layers of validation and trust in the digital representation of the physical object, as expert authenticating agents can personally inspect the object and ensure its details are accurately documented. The manual capture process not only enhances the overall accuracy of the digital twin but also instills greater confidence in potential buyers, insurers, and other stakeholders regarding the object's authenticity and provenance. Thus, the combination of controlled environments, expert authentication, and secure recording of pertinent information on a blockchain ensures a high level of trust, transparency, and accuracy in the digitization of valuable objects.

Before block 210, the one or more processing circuits can initiate a user onboarding process by creating an account with the blockchain or public distributed ledger. During this onboarding process, various information about the physical object, including details about the owner and metadata, is collected and securely stored. This metadata may include the object's provenance, history, dimensions, materials, and other relevant attributes. Once the information has been gathered, the one or more processing circuits can analyze the data and determine if the object qualifies for capture based on predefined criteria. These criteria may include factors such as the object's rarity, value, cultural significance, or specific requirements set by the platform, ensuring that only eligible objects undergo the capture process and are subsequently represented as digital twins on the blockchain.

In some arrangements, the one or more processors can be further configured to (1) receive, from a third-party computing system, a verifiable credential request associated with an authenticator, (2) authorize the authenticator based on analyzing and cross-referencing information of the authenticator with at least one of the metadata of the object or the capture event, (3) generate a digital identifier linked to an identity of the authenticator, (4) generate verifiable credentials corresponding to the digital identifier, wherein the verifiable credentials include verifiable data of the metadata of the object or the capture event, (5) broadcast the verifiable credentials to the distributed ledger, and (6) provide the digital identifier to the third-party computing system. In some arrangements, each of a plurality of digital identifiers is uniquely assigned to and cryptographically secured for each of a plurality of authenticators, and wherein each of the plurality of digital identifiers are configured to enable each of the plurality of authenticators to digitally sign one or more portions of the metadata of the object. In some arrangements, the one or more processors validate the one or more portions of the metadata in response to receiving a combination of the digital identifier and a digital signature of the one or more portions of the metadata.

In some arrangements, the one or more processors can be configured to perform a series of steps to authenticate and authorize a third-party authenticator. First, the processors receive a verifiable credential request associated with an authenticator from a third-party computing system. In some arrangements, this can include a request to verify an authenticator's expertise in a specific field, such as art or antique authentication. Next, the processors authorize the authenticator by analyzing and cross-referencing information provided by the authenticator with the metadata of the object or the capture event. In some arrangements, this can include checking the authenticator's credentials against a list of approved experts in a specific domain. Once the authenticator is authorized, the processors generate a digital identifier linked to the identity of the authenticator. In some arrangements, this can include creating a unique hash based on the authenticator's personal information and expertise. Following the creation of the digital identifier, the processors generate verifiable credentials corresponding to the digital identifier. In some arrangements, this can include generating a digitally signed certificate attesting to the authenticator's expertise and identity. After generating the verifiable credentials, the processors broadcast these credentials to the distributed ledger or blockchain. In some arrangements, this can include adding the verifiable credentials to a smart contract associated with the object or capture event. Finally, the processors provide the digital identifier to the third-party computing system, allowing the authenticator to securely access the system and interact with the object or capture event, as well as other parties involved in the process. In some arrangements, this can include granting the authenticator access to a secure portal where they can review and authenticate objects or capture events.

In general, a verifiable credential refers to a cryptographically secure, tamper-evident, and digitally signed piece of information that attests to the authenticity, ownership, or specific attributes of the physical object represented by the digital twin. It can serve as a digital proof that a third-party device 105 can use to verify that the digital twin and its associated metadata are genuine and accurate, based on the issuing authority's validation. For example, a museum may desire to verify the authenticity and provenance of a rare painting before exhibiting it. The museum, as a third-party device 105, sends a verifiable credential request to the data processing system 102 managing the digital twin of the painting. The authorization processor 130 can check the museum's request against the metadata object of the token associated with the painting and the capture event, ensuring that the museum is authorized to access this information. Upon successful authorization, the system generates a verifiable credential, which may include information such as the painting's authentication data, provenance, ownership history, and details of the capture event. The verifiable credential is then provided to the museum's third-party device 105, allowing the museum to independently verify the authenticity and provenance of the painting based on the digital twin and its metadata object stored in a token from a distributed ledger (e.g., blockchain storage 156). This process ensures that the museum can trust the information associated with the digital twin and make informed decisions regarding the exhibition of the painting.

A verifiable credential is not a key but rather a digital document or data structure that contains claims about an object, entity, or individual. The verifiable credential can issued by the data processing system 102, called the issuer, and can be digitally signed using cryptographic techniques to ensure its authenticity and integrity. The digital signature allows the verifiable credential to be trusted by other parties, known as verifiers. Accordingly, a verifiable credential could be a digital document containing information about the physical object, such as its authenticity, provenance, ownership history, and capture event details. The data processing system 102 managing the digital twin would act as the issuer, while the third-party device 105, like the museum in the previous example, would act as the verifier. When the verifier receives the verifiable credential, it can use the issuer's public key to verify the digital signature and confirm that the credential has not been tampered with and that it was indeed issued by the authoritative party. This process allows the verifier to trust the information contained within the verifiable credential without having to directly contact the issuer.

In some arrangements, the digital identifier can be a unique reference assigned to various parties (experts, appraisal agents, insurance agents, etc.) who may attest to certain details about the object or the capture event. This digital identifier can be used to identify and authenticate these parties. For example, parties can use their digital identifiers to digitally sign the verifiable credentials, which attest to their inspection, review, or validation of the object and its information. This digital signature can link the verifiable credential to the digital identifier of the party, ensuring the information is attributed to a specific, trusted source. For example, an expert in antique guitars can be assigned a unique digital identifier by the data processing system 102 (e.g., in particular the authorization processor 130). This identifier is cryptographically secured and linked to the expert's identity. The expert inspects an antique guitar during a photogrammetry capture event, verifying its authenticity, historical relevance, and provenance. The expert creates a verifiable credential containing the information they verified about the antique guitar. This verifiable credential includes details such as the guitar's origin, manufacturing date, ownership history, and condition. The expert digitally signs the verifiable credential using their digital identifier. This digital signature ensures that the verifiable credential can be traced back to the expert, confirming that the information provided is from a trusted and authenticated source. The verifiable credential, along with the expert's digital signature, is recorded on a blockchain or distributed ledger. This provides an immutable, tamper-resistant record of the expert's inspection and verification of the antique guitar.

In some arrangements, the metadata object of the corresponding non-fungible token (NFT) for the antique guitar will include references to the verifiable credential and the expert's digital identifier. This ensures that potential buyers, insurers, and other stakeholders can trust the authenticity, provenance, and other details of the antique guitar, as verified by the expert. Accordingly, the digital identifier serves as a unique reference for each party involved in the object's verification process. It is used to authenticate these parties when they digitally sign the verifiable credentials containing the information they verified. This process helps establish trust and ensure the authenticity and provenance of the object and its metadata in a decentralized and secure manner, as recorded on a blockchain or distributed ledger.

In some arrangements, to authorize the authenticator based on at least one of the metadata of the object or the capture event the one or more processing circuits can evaluate the credentials and expertise of the authenticator in relation to the specific object or capture event. This process ensures that the authenticator has the necessary qualifications, knowledge, and experience to verify the object's details, such as its authenticity, provenance, and historical relevance. For example, the object in question can be an antique guitar. The authorization process may involve verifying the following aspects: (1) the authenticator's identity—confirming that the authenticator is a legitimate expert in the field of antique guitars and not an imposter or unauthorized individual; (2) the authenticator's qualifications—ensuring that the authenticator has the necessary qualifications, such as relevant certifications, education, or professional affiliations, which attest to their expertise in antique guitars; (3) the authenticator's areas of expertise—confirming that the authenticator specializes in the specific type of guitar being evaluated, such as a particular brand, time period, or craftsmanship style; (4) the authenticator's experience and track record—evaluating the authenticator's history of successful appraisals, inspections, or other verifications of similar objects to ensure they have a reliable and trustworthy background in the field; (5) the capture event details—assessing the authenticator's involvement in the photogrammetry capture event, such as their presence during the capture process, their role in inspecting the object, and any relevant remarks they provided during the event. By authorizing the authenticator based on the metadata of the object or the capture event, the one or more processing circuits can ensure that the verifiable credentials provided by the authenticator are reliable and trustworthy. This authorization process not only bolsters the confidence of potential buyers, insurers, and other stakeholders in the object's authenticity and provenance but also helps maintain the overall integrity and security of the digital twin ecosystem.

In some arrangements, when a trade of the object occurs, the digital identifier and verifiable credentials can be used to ensure the authenticity and provenance of the object, as well as facilitating a smooth and secure transaction. For example, before the trade, potential buyers and other stakeholders can review the verifiable credentials associated with the object's digital identifier. By examining the credentials, they can confirm the object's authenticity, provenance, and other relevant details, such as the involvement of expert authenticators in the inspection process. In the above example, during the trade, the digital identifier of an authenticator can be used to sign the metadata associated with the object. This digital signature acts as proof of the authenticator's consent that the object being transferred is legitimate and demonstrates their authority to do so. The signature also ensures the integrity of the metadata and prevents unauthorized alterations. In the above example, upon completion of the trade, the new owner of the object can be recorded in the metadata and on the distributed ledger. This update reflects the change in ownership and adds to the object's provenance history. Verifiable credentials of any involved parties, such as authenticators, appraisers, or insurers, can also be updated to reflect their involvement in the trade, further enriching the object's metadata and history. Additionally, with respect to royalties, the digital identifier of the authenticator can be used to calculate and distribute royalties upon the trade of the object. The digital identifier helps to identify the entitled party, ensuring that they receive appropriate compensation for their work or investment in the object.

In general, the verifiable credentials can be on a distributed ledger, such as a blockchain, which ensures their security, immutability, and accessibility. By storing the credentials on a distributed ledger, it becomes virtually impossible for a single party to tamper with or alter the information without the consensus of the network participants. In addition to being stored on the distributed ledger, verifiable credentials can also be embedded or referenced in the metadata of the digital twin (e.g., a 3D object file or an NFT). This enables access to the credentials when stakeholders, such as potential buyers or insurers, need to review the authenticity, provenance, or other pertinent details of the object. In some cases, the actual verifiable credentials might not be stored directly in the metadata but rather be linked to them through a unique identifier (e.g., a hash or a digital identifier). This identifier serves as a secure reference to the credentials stored on the distributed ledger, allowing stakeholders to access and verify the credentials without requiring them to be stored within the metadata itself. By storing verifiable credentials on a distributed ledger and linking them to the metadata of the digital twin, the one or more processing circuits can maintain a secure and transparent record of the object's history, ensuring the trustworthiness of the information provided.

In some arrangements, to update the metadata object of the token to include verifiable credentials, a private key can be used. The private key can belong to the owner of the token or the party responsible for updating the metadata. The private key can be used to sign the updated metadata, ensuring that the changes are authentic and authorized by the rightful owner or authorized party. Once the updated metadata is signed using the private key, the corresponding public key can be used by other parties to verify the authenticity of the signed metadata. The public key can be derived from the private key but does not expose any sensitive information, ensuring the security of the private key. In this way, the private key is used to sign and authorize changes to the metadata, while the public key allows other parties to verify the authenticity and integrity of the updated metadata.

In some arrangements, the one or more processing circuits can incorporate the metadata of the digital twin or the metadata object into the 3D object file. For example, during the capture process, the one or more processing circuits may record details surrounding the event, such as the timestamp, location, and parties involved. One party might attest to the conditions of the subject being digitized or the conditions of the capture event by signing a transaction recorded on a distributed ledger technology (DLT). This exchange can serve as a record that the event occurred and may include digital signatures from accounts attesting to the event. If one such account is affiliated with a digital identifier (DID), which may act as an issuer in this case, the DID could contain a reference to a verifiable credential (VC). In this way, a party might offer their verifiable credentials to an exchange by signing it, and the transaction, recorded immutably on the DLT, is then referenced in the metadata of the non-fungible token (NFT) minted at a secondary step. In some arrangements, the metadata of the NFT might reference the DID document or unique identifier directly, instead of or in conjunction with the transaction.

Figure 3:
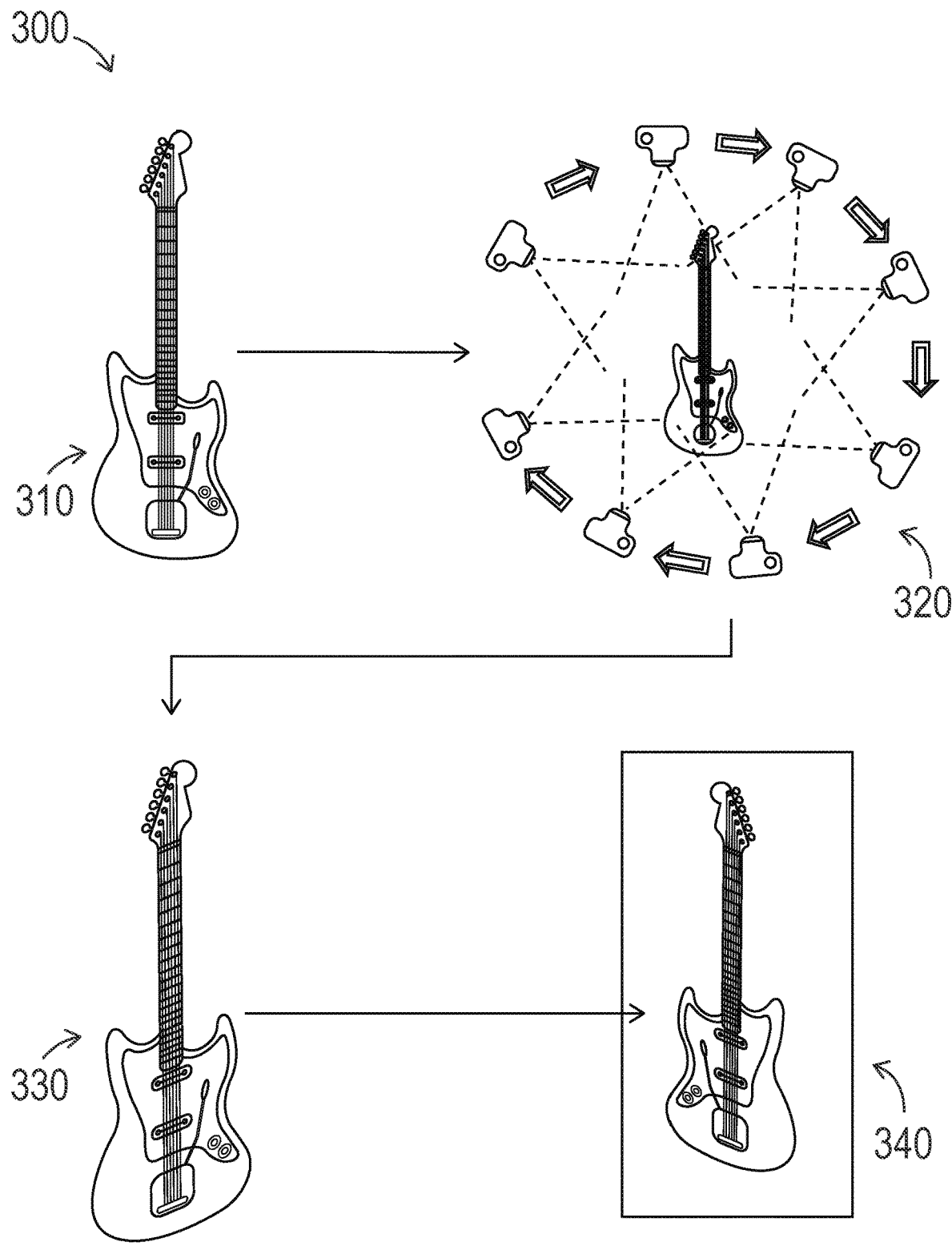
FIG. 3 illustrates a physical object modeling architecture, according to some arrangements.

Referring now to FIG. 3, a physical object modeling architecture 300 is shown, according to some arrangements. The architecture 300 provides a systematic process for creating a digital twin of a physical object and tokenizing it into a non-fungible token (NFT). The process begins with the 2D physical object, such as a guitar, depicted at step 310. To create an accurate digital representation, multiple captures of the physical object are taken from various angles and positions at step 320. These captures may consist of high-resolution images, videos, or other types of data, and may be obtained using specialized equipment and methodologies, such as photogrammetry or structured light scanning.

At step 330, the collected data is processed, and a 3D object file is created, representing the digital twin of the physical object. This 3D object file incorporates the captured details of the object's shape, surface texture, color, and other relevant attributes. The digital twin may then undergo additional processing or refinement based on specific requirements, such as resolution, level of detail, or file format compatibility. Finally, at step 340, the metadata and other information of the object and event is tokenized into a token, such as a non-fungible token (NFT). This token is a unique digital asset that represents the digital twin of the physical object and contains metadata with important information about the object, such as its provenance, authentication, and ownership. The tokenization process securely links the 3D object file with the token, ensuring that the digital twin is securely and immutably associated with its corresponding NFT on a blockchain or distributed ledger, providing a verifiable and tamper-resistant record of the physical object's digital representation.

Figure 4:
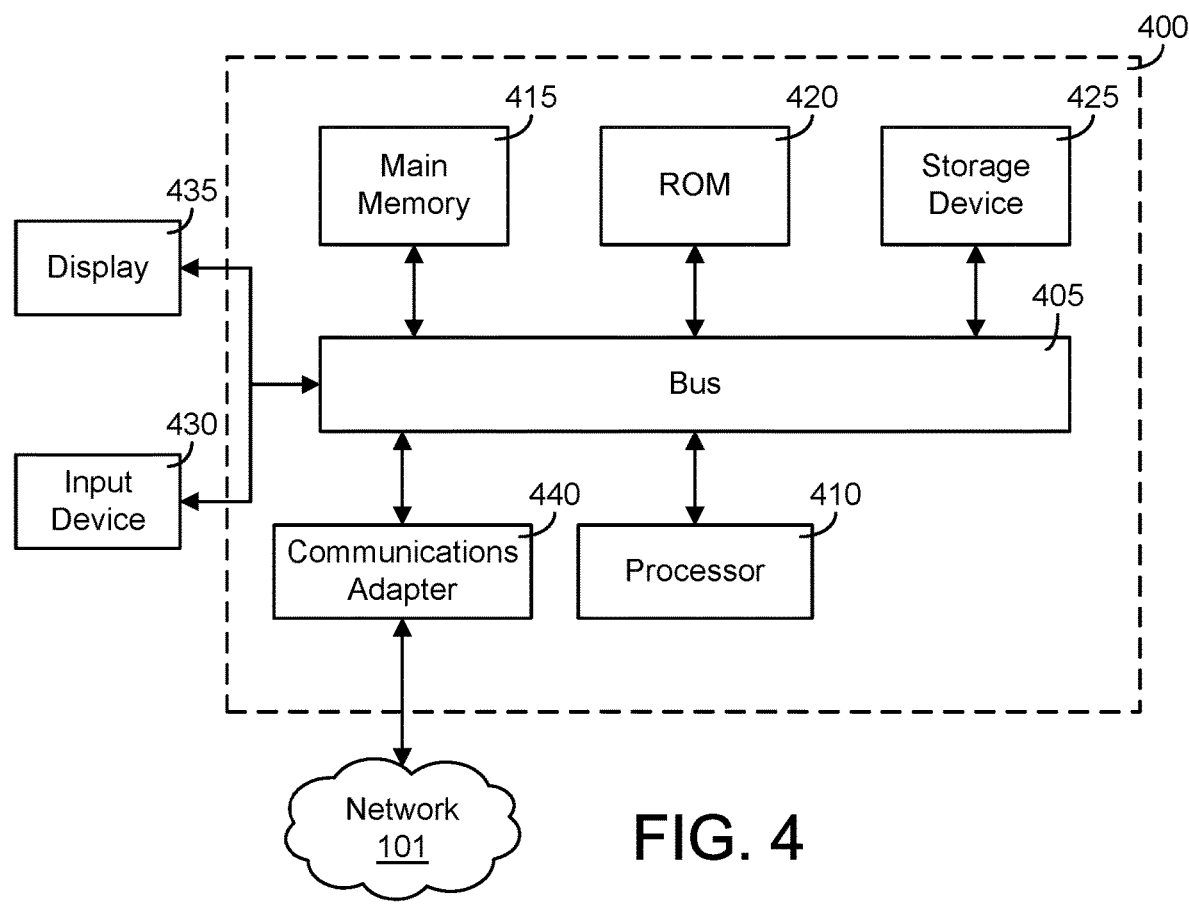
FIG. 4 is a block diagram illustrating an example computing system suitable for use in the various arrangements described herein.

FIG. 4 illustrates a depiction of a computer system 400 that can be used, for example, to implement an illustrative data processing system 102, an illustrative client system 103, an illustrative third-party device 105, and/or various other illustrative systems described in the present disclosure. The computing system 400 includes a bus 405 or other communication component for communicating information and a processor 410 coupled to the bus 405 for processing information. The computing system 400 also includes main memory 415, such as a random-access memory (RAM) or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid-state device, magnetic disk or optical disk, is coupled to the bus 405 for persistently storing information and instructions.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information, and command selections to the processor 410. In another implementation, the input device 430 has a touch screen display 435. The input device 430 can include a cursor control, such as a mouse, a trackball, or cursor direction keys, for communicating direction information and command selections to the processor 410 and for controlling cursor movement on the display 435.

In some implementations, the computing system 400 may include a communications adapter 440, such as a networking adapter. Communications adapter 440 may be coupled to bus 405 and may be configured to enable communications with a computing or communications network 101 and/or other computing systems. In various illustrative implementations, any type of networking configuration may be achieved using communications adapter 440, such as wired (e.g., via Ethernet), wireless (e.g., via Wi-Fi, Bluetooth, etc.), pre-configured, ad-hoc, LAN, WAN, etc.

According to various implementations, the processes that effectuate illustrative implementations that are described herein can be achieved by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. In alternative implementations, hard-wired circuitry may be used in place of or in combination with software instructions to implement illustrative implementations. Thus, implementations are not limited to any specific combination of hardware circuitry and software.

Although an example processing system has been described in FIG. 4, implementations of the subject matter and the functional operations described in this specification can be carried out using other types of digital electronic circuitry, or in computer software, firmware, or hardware, including the structures disclosed in this specification and their structural equivalents, or in combinations of one or more of them.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the disclosure be defined by the claims appended hereto and their equivalents.

What is claimed is:

1. A system to model and tokenize objects, the system comprising:
   a token storage comprising a plurality of smart contracts; and
   a data processing system comprising an authorization processor, one or more processors, and memory storing executable instructions that, when executed by the one or more processors cause the one or more processors to execute operations of:
      capturing, from an application of a user device, a content dataset of an object and capture event parameters of a capture event of the object, wherein the content dataset comprises a set of images and comprising (i) overlapping images of the object in the set of images and associated metadata of the object or (ii) point cloud content of the object comprising three-dimensional (3D) coordinates representing surfaces in the set of images and the associated metadata of the object, and wherein the event parameters comprise at least environmental conditions during the capture of the set of images or settings of a camera during the capture of the set of images;
      generating a three-dimensional (3D) object file comprising a metadata object based on the set of images of the object, wherein the 3D object file comprises a digital twin of the object;
      capturing one or more object attributes of the set of images;
      extracting a portion of the one or more object attributes and storing the extracted portion in the 3D object file;
      generating an identifier for at least one attestation party corresponding to the object or the capture event of the object, the identifier corresponding to an account comprising a credential;
      linking, via the authorization processor, the identifier to the account using one or more references or links, wherein the account corresponds to an identity of the at least one attestation party comprising at least one of a creator or authenticator corresponding with the object or the capture event of the object;
      embedding the identifier into the 3D object file;
      broadcasting the 3D object file to a distributed ledger;
      minting, based on the broadcasting of the 3D object file and a type of the distributed ledger, a non-fungible token (NFT);
      associating the NFT with a smart contract of the plurality of smart contracts, wherein the minted NFT comprises a blockchain link or reference to the associated smart contract;
      storing the minted NFT at a digital wallet address of a wallet storage of the user device; and
      providing the identifier to a third-party computing system.

2. The system of claim 1 wherein the memory further comprises instructions that when executed by the one or more processors cause the one or more processors to execute operations of:
   in response to receiving a transfer request on the distributed ledger, calculating a payment amount associated with a royalty of a curator according to the metadata object of the minted NFT; and
   distributing a payment according to the payment amount to a curator wallet address associated with the curator.

3. The system of claim 1, wherein the memory further comprises instructions that when executed by the one or more processors cause the one or more processors to execute operations of:
   extracting metadata of the metadata object based on analyzing the content dataset and capture event parameters, wherein the metadata comprise historical data, provenance data, appraisal data, and authentication data; and
   wherein the metadata object comprises a timestamp and date of the capture event.

4. The system of claim 1, wherein the memory further comprises instructions that when executed by the one or more processors cause the one or more processors to execute operations of:
   determining additional processing to perform on the 3D object file based on one or more 3D object file parameters, wherein the one or more 3D object file parameters comprise at least one of a resolution, a level of detail, a file format compatibility, a texture mapping, or a surface normal adjustments; and
   re-generating the 3D object file of the object by applying the additional processing to the 3D object file.

5. The system of claim 1, the one or more processors further configured to:
   receiving, from the third-party computing system, a verifiable credential request associated with the authenticator;
   authorize the authenticator based on analyzing and cross-referencing information of the authenticator with at least one of metadata of the metadata object or the capture event.

6. The system of claim 1 wherein the memory further comprises instructions that when executed by the one or more processors cause the one or more processors to execute operations of: validating one or more portions of the metadata in response to receiving a combination of the identifier and a digital signature of the one or more portions of the metadata.

7. The system of claim 1, wherein the memory further comprises instructions that when executed by the one or more processors cause the one or more processors to execute operations of:
   determining an authentication agent of the object based on the capture event and a plurality of environmental information comprising at least one of a physical object origin, a physical object category, a physical object value, a physical object rarity;
   collecting authentication agent; and
   updating, using a private key corresponding to the digital wallet address of the wallet storage of the user device, the metadata object of the minted NFT to by adding the authentication agent information and at least one of a condition of the object, a change to the object, or an addition to the object.

8. The system of claim 1, wherein the content dataset comprises at least one or more captured images, videos, or audio of the object, and wherein the capture event parameters comprise at least a date, time, location, parties present or involved, and environmental conditions of the capture event.

9. The system of claim 1, wherein the memory further comprises instructions that when executed by the one or more processors cause the one or more processors to execute operations of:
generating a verifiable credential corresponding to the one or more object attributes during the capture event, wherein the one or more object attributes comprising verifiable detail or information of the capture event or the object is stored the metadata object of the 3D object file;
embedding the verifiable credential into the metadata object of the 3D object file; and
presenting, via the application of the user device, the 3D object file comprising adjustable content.

10. The system of claim 1, wherein broadcasting comprises:
encoding the 3D object file, the content dataset, and the capture event parameters;
signing the encoded 3D object file, content dataset, and capture event parameters with a private key corresponding to the digital wallet address of the wallet storage of the user device;
transmitting the signed 3D object file, content dataset, and capture event parameters to a network of nodes participating in the distributed ledger; and
incorporating the minted NFT into a new block of exchanges, wherein the new block appends to an existing chain of blocks in the distributed ledger.

11. A method to model and tokenize objects, the method comprising:
capturing, by one or more processing circuits comprising an authorization processor from an application of a user device, a content dataset of an object and capture event parameters of a capture event of the object, wherein the content dataset comprises a set of images and comprising (i) overlapping images of the object in the set of images and associated metadata of the object or (ii) point cloud content of the object comprising three-dimensional (3D) coordinates representing surfaces in the set of images and the associated metadata of the object, and wherein the event parameters comprise at least environmental conditions during the capture of the set of images or settings of a camera during the capture of the set of images;
generating, by the one or more processing circuits, a three-dimensional (3D) object file comprising a metadata object based on the set of images of the object, wherein the 3D object file comprises a digital twin of the object;
capturing, by the one or more processing circuits, one or more object attributes of the set of images;
extracting, by the one or more processing circuits, a portion of the one or more object attributes and storing, by the one or more processing circuits, the extracted portion in the 3D object file;
generating, by the one or more processing circuits, an identifier for at least one attestation party corresponding to the object or the capture event of the object, the identifier corresponding to an account comprising a credential;
linking, by the one or more processing circuits, via the authorization processor, the identifier to the account using one or more references or links, wherein the account corresponds to an identity of the at least one attestation party comprising at least one of a creator or authenticator corresponding with the object or the capture event of the object;
embedding, by the one or more processing circuits, the identifier into the 3D object file;
broadcasting, by the one or more processing circuits, the 3D object file to a distributed ledger;
minting, by the one or more processing circuits based on the broadcasting of the 3D object file and a type of the distributed ledger, a non-fungible token (NFT);
associating, by the one or more processing circuits, the NFT with a smart contract of a plurality of smart contracts stored in a token storage, wherein the minted NFT comprises a blockchain link or reference to the associated smart contract;
storing, by the one or more processing circuits, the minted NFT at a digital wallet address of a wallet storage of the user device; and
providing, by the one or more processing circuits, the identifier to a third-party computing system.

12. The method of claim 11, further comprising:
in response to receiving a transfer request on the distributed ledger, calculating, by the one or more processing circuits, a payment amount associated with a royalty of a curator according to the metadata object of the minted NFT; and
distributing, by the one or more processing circuits, a payment according to the payment amount to a curator wallet address associated with the curator.

13. The method of claim 11, further comprising:
extracting, by the one or more processing circuits, metadata of the metadata object based on analyzing the content dataset and capture event parameters, wherein the metadata comprise historical data, provenance data, appraisal data, and authentication data; and
wherein the metadata object comprises a timestamp and date of the capture event.

14. The method of claim 11, further comprising:
determining, by the one or more processing circuits, additional processing to perform on the 3D object file based on one or more 3D object file parameters, wherein the one or more 3D object file parameters comprise at least one of a resolution, a level of detail, a file format compatibility, a texture mapping, or a surface normal adjustments; and
re-generating, by the one or more processing circuits, the 3D object file of the object by applying the additional processing to the 3D object file.

15. The method of claim 11, further comprising:
receiving, by the one or more processing circuits from the third-party computing system, a verifiable credential request associated with the authenticator;
authorizing, by the one or more processing circuits, the authenticator based on analyzing and cross-referencing information of the authenticator with at least one of metadata of the metadata object or the capture event.

16. The method of claim 11, further comprising:
determining, by the one or more processing circuits, an authentication agent of the object based on the capture event and a plurality of environmental information comprising at least one of a physical object origin, a physical object category, a physical object value, a physical object rarity;

collecting, by the one or more processing circuits, authentication agent information; and updating, by the one or more processing circuits using a private key corresponding to the digital wallet address of the wallet storage of the user device, the metadata object of the NFT to further comprise the authentication agent information and at least one of a condition of the object, a change to the object, or an addition to the object.

17. A non-transitory computer readable medium including one or more instructions stored thereon, and when the one or more instructions are executed by at least one processor comprising an authorization processor causes the at least one processor to perform:

capturing, from an application of a user device, a content dataset of an object and capture event parameters of a capture event of the object, wherein the content dataset comprises a set of images and comprising (i) overlapping images of the object in the set of images and associated metadata of the object or (ii) point cloud content of the object comprising three-dimensional (3D) coordinates representing surfaces in the set of images and the associated metadata of the object, and wherein the event parameters comprise at least environmental conditions during the capture of the set of images or settings of a camera during the capture of the set of images;

generating a three-dimensional (3D) object file comprising a metadata object based on the set of images of the object, wherein the 3D object file comprises a digital twin of the object;

capturing one or more object attributes of the set of images;

extracting a portion of the one or more object attributes and storing the extracted portion in the 3D object file;

generating an identifier for at least one attestation party corresponding to the object or the capture event of the object, the identifier corresponding to an account comprising a credential;

linking, via the authorization processor, the identifier to the account using one or more references or links, wherein the account corresponds to an identity of the at least one attestation party comprising at least one of a creator or authenticator corresponding with the object or the capture event of the object;

embedding the identifier into the 3D object file;

broadcasting the 3D object file to a distributed ledger;

minting, based on the broadcasting of the 3D object file and a type of the distributed ledger, a non-fungible token (NFT);

associating the NFT with a smart contract of a plurality of smart contracts stored in a token storage, wherein the minted NFT comprises a blockchain link or reference to the associated smart contract;

storing the minted NFT at a digital wallet address of a wallet storage of the user device; and providing the identifier to a third-party computing system.

18. The non-transitory computer readable medium of claim 17, additional instructions are stored thereon, and when the one or more instructions are executed by the at least one processor causes the at least one processor further to perform:

in response to receiving a transfer request on the distributed ledger, calculating a payment amount associated with a royalty of a curator according to the metadata object of the minted NFT; and distributing a payment according to the payment amount to a curator wallet address associated with the curator.

* * * * *